United States Patent
Ogihara et al.

(10) Patent No.: US 7,616,766 B2
(45) Date of Patent: Nov. 10, 2009

(54) DATA DIVISION METHOD AND DEVICE USING EXCLUSIVE OR CALCULATION

(75) Inventors: Toshihiko Ogihara, Tokyo (JP); Susumu Nomura, Tokyo (JP)

(73) Assignee: NTT Communications Corporation (JP)

( * ) Notice: Subject to any disclaimer, the term of this patent is extended or adjusted under 35 U.S.C. 154(b) by 892 days.

(21) Appl. No.: 10/539,846

(22) PCT Filed: Dec. 19, 2003

(86) PCT No.: PCT/JP03/16389

§ 371 (c)(1),
(2), (4) Date: Jun. 20, 2005

(87) PCT Pub. No.: WO2004/057461

PCT Pub. Date: Jul. 8, 2004

(65) Prior Publication Data

US 2006/0072744 A1    Apr. 6, 2006

(30) Foreign Application Priority Data

Dec. 19, 2002    (JP) .............................. 2002-367608

(51) Int. Cl.
*H04L 9/24* (2006.01)
(52) U.S. Cl. ......................................... 380/286; 380/28
(58) Field of Classification Search .................. 380/286
See application file for complete search history.

(56) References Cited

U.S. PATENT DOCUMENTS

| | | | | |
|---|---|---|---|---|
| 5,623,548 | A | * | 4/1997 | Akiyama et al. ............... 380/28 |
| 6,047,069 | A | | 4/2000 | Hogan |
| 6,088,449 | A | | 7/2000 | Atalla |
| 6,810,122 | B1 | * | 10/2004 | Miyazaki et al. ............... 380/30 |
| 6,996,724 | B2 | * | 2/2006 | Murakami et al. ........... 713/193 |
| 2001/0012362 | A1 | | 8/2001 | Marzahn |
| 2002/0097868 | A1 | * | 7/2002 | Watanabe et al. .............. 380/46 |
| 2003/0147535 | A1 | * | 8/2003 | Nadooshan et al. .......... 380/277 |

FOREIGN PATENT DOCUMENTS

WO    WO 99/41877    8/1999

* cited by examiner

*Primary Examiner*—Matthew B Smithers
(74) *Attorney, Agent, or Firm*—Kilpatrick Stockton LLP

(57) ABSTRACT

A plurality of original partial data are generated by dividing the original data by the prescribed processing unit bit length, a plurality of random number partial data each having a length less than or equal to the prescribed processing unit bit length are generated in correspondence to the plurality of original partial data, and a plurality of divided partial data that constitute each divided data are generated by using exclusive OR calculation of the original partial data and the random number partial data, each divided partial data having a length equal to the prescribed processing unit bit length. Then, the divided data in the desired number of division are generated from the plurality of divided partial data, such that the original data cannot be ascertained from any one divided data alone but the original data can be recovered from a prescribed number of the divided data among generated divided data.

12 Claims, 13 Drawing Sheets

FIG.4

DIVISION INTO THREE (n=3)
ORIGINAL DATA CAN BE RECOVERED FROM ANY TWO DIVIDED DATA (m IS ARBITRARY INTEGER m>0)

| VALUE OF j | 1 | 2 | ... | j=2×m+1 | j+1 | ... |
|---|---|---|---|---|---|---|
| ORIGINAL DATA S(j) | S(1) | S(2) | ... | S(j) | S(j+1) | ... |
| RANDOM NUMBER R(j) | R(1) | R(2) | ... | R(j) | R(j+1) | ... |
| DIVIDED PARTIAL DATA D(1,j) | S(1)*R(1)*R(2) | S(2)*R(1)*R(2) | ... | S(j)*R(j)*R(j+1) | S(j+1)*R(j)*R(j+1) | ... |
| DIVIDED PARTIAL DATA D(2,j) | S(1)*R(1) | S(2)*R(2) | ... | S(j)*R(j) | S(j+1)*R(j+1) | ... |
| DIVIDED PARTIAL DATA D(3,j) | R(1) | R(2) | ... | R(j) | R(j+1) | ... |

→CONTINUED TO TAIL OF ORIGINAL DATA S

FIG.6

DIVISION INTO FOUR (n=4)

ORIGINAL DATA CAN BE RECOVERED FROM ANY THREE DIVIDED DATA (OR TWO DIVIDED DATA IN SOME CASES)

| VALUE OF j | 1 | 2 | 3 | ... |
|---|---|---|---|---|
| ORIGINAL DATA S(j) | S(1) | S(2) | S(3) | ... |
| RANDOM NUMBER R(j) | R(1) | R(2) | R(3) | ... |
| DIVIDED PARTIAL DATA D(1,j) | S(1)*R(1)*R(2)*(R3) | S(2)*R(1)*R(2)*(R3) | S(3)*R(1)*R(2)*(R3) | ... |
| DIVIDED PARTIAL DATA D(2,j) | S(1)*R(1)*R(2) | S(2) | *R(2)*(R3) | S(3)*R(1) | ... |
| DIVIDED PARTIAL DATA D(3,j) | S(1)*R(1) | S(2) | *R(2) | S(3) | *R(3) | ... |
| DIVIDED PARTIAL DATA D(4,j) | R(1) | R(2) | R(3) | ... |

(A)

(m IS ARBITRARY INTEGER m>0)

| ... | j=3×m+1 | j+1 | j+2 | ... |
|---|---|---|---|---|
| ... | S(j) | S(j+1) | S(j+2) | ... |
| ... | R(j) | R(j+1) | R(j+2) | ... |
| ... | S(j)*R(j)*R(j+1)*R(j+2) | S(j+1)*R(j)*R(j+1)*R(j+2) | S(j+2)*R(j)*R(j+1)*R(j+2) | ... |
| ... | S(j)*R(j)*R(j+1) | S(j+1) | *R(j+1)*R(j+2) | S(j+2)*R(j) | *R(j+2) | ... |
| ... | S(j)*R(j) | S(j+1) | *R(j+1) | S(j+2) | *R(j+2) | ... |
| ... | R(j) | R(j+1) | R(j+2) | ... |

(A) → CONTINUED TO TAIL OF ORIGINAL DATA S

FIG. 7

DIVISION INTO FIVE (n=5)
ORIGINAL DATA CAN BE RECOVERED FROM
ANY THREE DIVIDED DATA (OR TWO DIVIDED DATA IN SOME CASES)

| VALUE OF j | 1 | 2 | 3 | 4 | ... |
|---|---|---|---|---|---|
| ORIGINAL DATA S(j) | S(1) | S(2) | S(3) | S(4) | ... |
| RANDOM NUMBER (j) | R(1) | R(2) | R(3) | R(4) | ... |
| DIVIDED PARTIAL DATA D(1,j) | S(1)*R(1)*R(2)*(R3)*(R4) | S(2)*R(1)*R(2)*(R3)*(R4) | S(3)*R(1)*R(2)*(R3)*(R4) | S(4)*R(1)*R(2)*(R3)*(R4) | ... |
| DIVIDED PARTIAL DATA D(2,j) | S(1)*R(1)*R(2)*R(3) | S(2) *R(2)*(R3)*(R4) | *(R3)*(R4) | S(4)*R(1)*R(2) *(R4) | ... |
| DIVIDED PARTIAL DATA D(3,j) | S(1)*R(1)*R(2) | S(2) *R(2)*(R3) | S(3)*R(1) *(R3)*(R4) | S(4)*R(1) *(R4) | ... |
| DIVIDED PARTIAL DATA D(4,j) | S(1)*R(1) | S(2) *R(2) | S(3) *R(3) | S(4) | ... |
| DIVIDED PARTIAL DATA D(5,j) | R(1) | R(2) | R(3) | R(4) | ... |

(m IS ARBITRARY INTEGER m>0)

| ... | j=4×m+1 | j+1 | j+2 | j+3 | ... |
|---|---|---|---|---|---|
| ... | S(j) | S(j+1) | S(j+2) | S(j+3) | ... |
| ... | R(j) | R(j+1) | R(j+2) | R(j+3) | ... |
| ... | S(j)*R(j)*R(j+1)*R(j+2)*R(j+3) | S(j+1)*R(j)*R(j+1)*R(j+2)*R(j+3) | S(j+2)*R(j)*R(j+1)*R(j+2)*R(j+3) | S(j+3)*R(j)*R(j+1)*R(j+2)*R(j+3) | ... |
| ... | S(j)*R(j)*R(j+1)*R(j+2) | *R(j+1)*R(j+2)*R(j+3) | S(j+2)*R(j) *R(j+2)*R(j+3) | S(j+3)*R(j)*R(j+1) *R(j+3) | ... |
| ... | S(j)*R(j)*R(j+1) | S(j+1) *R(j+1)*R(j+2) | S(j+2)*R(j) *R(j+2) | S(j+3)*R(j)*R(j+1) | ... |
| ... | S(j)*R(j) | S(j+1) *R(j+1) | S(j+2) *R(j+2) | S(j+3) *R(j+3) | ... |
| ... | R(j) | R(j+1) | R(j+2) | R(j+3) | ... |

→ CONTINUED TO TAIL OF ORIGINAL DATA S

FIG.10

DIVISION INTO THREE (n=3)
ORIGINAL DATA CAN BE RECOVERED FROM ANY TWO DIVIDED DATA (m IS ARBITRARY INTEGER m>0)

| VALUE OF j | 1 | 2 | ... | j=2×m+1 | j+1 | ... |
|---|---|---|---|---|---|---|
| ORIGINAL DATA S(j) | S(1) | S(2) | ... | S(j) | S(j+1) | ... |
| RANDOM NUMBER R(j) | R(1) | R(2) | ... | R(j) | R(j+1) | ... |
| DIVIDED PARTIAL DATA D(1,j) | S(1)*R(1)*R(2) | S(2)*R(2) | ... | S(j)*R(j)*R(j+1) | S(j+1)*R(j+1) | ... |
| DIVIDED PARTIAL DATA D(2,j) | S(1)*R(1) | S(2)*R(1)*R(2) | ... | S(j)*R(j) | S(j+1)*R(j)*R(j+1) | ... |
| DIVIDED PARTIAL DATA D(3,j) | R(1) | R(2) | ... | R(j) | R(j+1) | ... |

→ CONTINUED TO TAIL OF ORIGINAL DATA S

FIG.11

DIVISION INTO THREE (n=3)
ORIGINAL DATA CAN BE RECOVERED FROM ANY TWO DIVIDED DATA (m IS ARBITRARY INTEGER m>0)

| VALUE OF j | 1 | 2 | ... | j=2×m+1 | j+1 | ... |
|---|---|---|---|---|---|---|
| ORIGINAL DATA S(j) | S(1) | S(2) | ... | S(j) | S(j+1) | ... |
| RANDOM NUMBER R(j) | R(1) | R(2) | ... | R(j) | R(j+1) | ... |
| DIVIDED PARTIAL DATA D(1,j) | S(1) *R(2) | S(2)*R(1)*R(2) | ... | S(j) *R(j+1) | S(j+1)*R(j)*R(j+1) | ... |
| DIVIDED PARTIAL DATA D(2,j) | S(1)*R(1) | S(2) *R(2) | ... | S(j)*R(j) | S(j+1) *R(j+1) | ... |
| DIVIDED PARTIAL DATA D(3,j) | R(1) | R(2) | ... | R(j) | R(j+1) | ... |

→CONTINUED TO TAIL OF ORIGINAL DATA S

FIG.12

DIVISION INTO FOUR (n=4)
ORIGINAL DATA CAN BE RECOVERED FROM
ANY THREE DIVIDED DATA (OR TWO DIVIDED DATA IN SOME CASES)

| VALUE OF j | 1 | 2 | 3 | ... |
|---|---|---|---|---|
| ORIGINAL DATA S(j) | S(1) | S(2) | S(3) | ... |
| RANDOM NUMBER R(j) | R(1) | R(2) | R(3) | ... |
| DIVIDED PARTIAL DATA D(1,j) | S(1)*R(2)*(R3) | S(2)*R(1)*R(2)*(R3) | S(3)*R(1)*R(2)*(R3) | ... |
| DIVIDED PARTIAL DATA D(2,j) | S(1)*R(2) | S(2)*R(2)*(R3) | S(3)*R(1) | ... |
| DIVIDED PARTIAL DATA D(3,j) | S(1)*R(1) | S(2) | S(3) | ... |
| DIVIDED PARTIAL DATA D(4,j) | R(1) | R(2) | R(3) | ... |

(m IS ARBITRARY INTEGER m>0)

| ... | j=3×m+1 | j+1 | j+2 | ... |
|---|---|---|---|---|
| ... | S(j) | S(j+1) | S(j+2) | ... |
| ... | R(j) | R(j+1) | R(j+2) | ... |
| ... | S(j)*R(j+1)*R(j+2) | S(j+1)*R(j)*R(j+1)*R(j+2) | S(j+2)*R(j)*R(j+1)*R(j+2) | ... |
| ... | S(j)*R(j+1) | S(j+1)*R(j+1)*R(j+2) | S(j+2)*R(j) | ... |
| ... | S(j)*R(j) | S(j+1) | S(j+2) | ... |
| ... | R(j) | R(j+1) | R(j+2) | ... |

→ CONTINUED TO TAIL OF ORIGINAL DATA S

FIG.13

DIVISION INTO FIVE (n=5)
ORIGINAL DATA CAN BE RECOVERED FROM ANY THREE DIVIDED DATA (OR TWO DIVIDED DATA IN SOME CASES)

| VALUE OF j | 1 | 2 | 3 | 4 | ... |
|---|---|---|---|---|---|
| ORIGINAL DATA S(j) | S(1) | S(2) | S(3) | S(4) | ... |
| RANDOM NUMBER (j) | R(1) | R(2) | R(3) | R(4) | ... |
| DIVIDED PARTIAL DATA D(1,j) | S(1) | S(2)*R(1)*R(2)*(R3)*(R4) | S(3)*R(1)*R(2)*(R3)*(R4) | S(4)*R(1)*R(2)*(R3)*(R4) | ... |
| DIVIDED PARTIAL DATA D(2,j) | S(1)*R(2)*(R3)*(R4) | S(2) | S(3)*R(1) | S(4)*R(1)*R(2) | ... |
| DIVIDED PARTIAL DATA D(3,j) | S(1)*R(2)*(R3) | S(2)*(R3)*(R4) | S(3) | S(4)*R(1)*R(2) | ... |
| DIVIDED PARTIAL DATA D(4,j) | S(1)*R(2) | S(2) | *R(3)*(R4) | S(4)*R(1) | ... |
| DIVIDED PARTIAL DATA D(5,j) | R(1) | R(2) | R(3) | R(4) | ... |

(m IS ARBITRARY INTEGER m>0)

| | j=4×m+1 | j+1 | j+2 | j+3 | ... |
|---|---|---|---|---|---|
| | S(j) | S(j+1) | S(j+2) | S(j+3) | ... |
| | R(j) | R(j+1) | R(j+2) | R(j+3) | ... |
| | S(j) | S(j+1)*R(j)*R(j+1)*R(j+2)*R(j+3) | S(j+2)*R(j)*R(j+1)*R(j+2)*R(j+3) | S(j+3)*R(j)*R(j+1)*R(j+2)*R(j+3) | ... |
| | S(j)*R(j+1)*R(j+2) | S(j+1) | *R(j+1)*R(j+2)*R(j+3) | S(j+3)*R(j)*R(j+1) | ... |
| | S(j)*R(j+1) | *R(j+1)*R(j+2) | S(j+2)*R(j) | S(j+3)*R(j)*R(j+1) | ... |
| | S(j)*R(j) | *R(j+1) | S(j+2)*R(j+3) | S(j+3)*R(j+3) | ... |
| | R(j) | R(j+1) | R(j+2) | R(j+3) | ... |

→ CONTINUED TO TAIL OF ORIGINAL DATA S

ND DEVICE
DATA DIVISION METHOD AND DEVICE USING EXCLUSIVE OR CALCULATION

TECHNICAL FIELD

The present invention relates to data division method and device which are effective in the case of maintaining data in division in order to secure secrecy and safety of the data, and more particularly to data division method and device which divide original data into a desired number of divided data according to a desired processing unit bits.

BACKGROUND ART

In the case of maintaining important secret data (referred hereafter as original data), there are potential threats such as loss, destruction, theft and privacy violation. Such threats cannot be prevented by simply encrypting the data to be maintained in secret, and it is effective to produce plural copies in anticipation of the loss or destruction, but the production of plural copies increases a risk of the theft.

As a conventional method for resolving such a problem, there is a threshold secret sharing scheme (see A. Shamir "How to Share a Secret", Comm. Assoc. Comput. Mach., Vol. 22, no. 11, pp. 612-613 (November 1979), for example). In this conventional method, the original data S is divided into n sets of divided data, and the original data S can be recovered by collecting at least a certain number x sets of the divided data among the n sets of the divided data, but the original data S cannot be recovered by collecting only x-1 sets of the divided data. Consequently, the original data S is not leaked even if as many as x-1 sets of the divided data are stolen, and the original data S can be recovered even if as much as n-x sets of the divided data are lost or destroyed.

As a representative example for realizing this method, there is a method using (n−1)-th degree polynomial and the residue calculation (see Bruce Schneier "Applied Cryptography", John Wiley & Sons, Inc., pp. 383-384 (1994)., for example). This conventional method has been utilized in the divisional management of a secret key of the public key cryptosystem, where the amount of data to be maintained is not so large so that it does not cause any problem in terms of the calculation processing power of the current computer and the cost of the memory device or medium.

However, when this conventional method is utilized in the case where the amount of data to be maintained safely becomes Megabytes, Gigabytes or even greater, it will require a calculation processing power capable of carrying out the calculation processing of multiple length integers including the polynomial calculation and the residue calculation with respect to a huge amount of data. Moreover, in this conventional method, five divided data of one byte length are generated from data of one byte length in the case where the number of division n is 5, so that it will require a large memory capacity that is linearly proportional to the number of division with respect to the original data. Thus there has been a problem that it is impractical to realize the conventional method by using the computer.

Also, in the conventional method described above, a unit of processing for the division calculation is set up in order to secure the secrecy of the data, but this unit of processing for the division calculation requires a certain data length, and there has been a problem that the division calculation cannot be carried out at arbitrary unit of processing.

DISCLOSURE OF THE INVENTION

It is therefore an object of the present invention to provide data division method and device which are capable of dividing the original data efficiently by a relatively simple processing.

According to one aspect of the present invention there is provided a data division method for dividing original data into as many divided data as a desired number of division by using a prescribed processing unit bit length, comprising the steps of: generating a plurality of original partial data by dividing the original data by the prescribed processing unit bit length; generating a plurality of random number partial data each having a length equal to the prescribed processing unit bit length, from a random number having a length less than or equal to a bit length of the original data, in correspondence to the plurality of original partial data; generating a plurality of divided partial data that constitute each divided data by using exclusive OR calculation of the original partial data and the random number partial data, each divided partial data having a length equal to the prescribed processing unit bit length; and generating the divided data in the desired number of division from the plurality of divided partial data, such that the original data cannot be ascertained from any one divided data alone but the original data can be recovered from a prescribed number of the divided data among generated divided data.

According to another aspect of the present invention there is provided a data division device for dividing original data into as many divided data as a desired number of division by using a prescribed processing unit bit length, comprising: an original partial data generation unit configured to generate a plurality of original partial data by dividing the original data by the prescribed processing unit bit length; a random number generation unit configured to generate a plurality of random number partial data each having a length equal to the prescribed processing unit bit length, from a random number having a length less than or equal to a bit length of the original data, in correspondence to the plurality of original partial data; a divided partial data generation unit configured to generate a plurality of divided partial data that constitute each divided data by using exclusive OR calculation of the original partial data and the random number partial data, each divided partial data having a length equal to the prescribed processing unit bit length; and a divided data generation unit configured to generate the divided data in the desired number of division from the plurality of divided partial data, such that the original data cannot be ascertained from any one divided data alone but the original data can be recovered from a prescribed number of the divided data among generated divided data.

According to another aspect of the present invention there is provided a computer program product for causing a computer to function as a data division device for dividing original data into as many divided data as a desired number of division by using a prescribed processing unit bit length, the computer program product comprising: a first computer program code for causing the computer to generate a plurality of original partial data by dividing the original data by the prescribed processing unit bit length; a second computer program code for causing the computer to generate a plurality of random number partial data each having a length equal to the prescribed processing unit bit length, from a random number having a length less than or equal to a bit length of the original data, in correspondence to the plurality of original partial data; a third computer program code for causing the computer to generate a plurality of divided partial data that constitute each divided data by using exclusive OR calculation of the original partial data and the random number partial data, each divided partial data having a length equal to the prescribed processing unit bit length; and a fourth computer program code for causing the computer to generate the divided data in the desired number of division from the plurality of divided partial data, such that the original data cannot be ascertained from any one divided data alone but the original data can be recovered from a prescribed number of the divided data among generated divided data.

Other features and advantages of the present invention will become apparent from the following description taken in conjunction with the accompanying drawings.

BRIEF DESCRIPTION OF THE DRAWINGS

FIG. 4 is a table showing divided partial data and their definition formula in the case of division into three according to one embodiment of the present invention.

FIG. 6 is a table showing divided partial data and their definition formula in the case of division into four according to one embodiment of the present invention.

FIG. 7 is a table showing divided partial data and their definition formula in the case of division into five according to one embodiment of the present invention.

FIG. 10 is a table showing divided partial data and their definition formula in the case of division into three according to another embodiment of the present invention.

FIG. 11 is a table showing divided partial data and their definition formula in the case of division into three according to still another embodiment of the present invention.

FIG. 12 is a table showing divided partial data and their definition formula in the case of division into four according to still another embodiment of the present invention.

FIG. 13 is a table showing divided partial data and their definition formula in the case of division into five according to still another embodiment of the present invention.

BEST MODE FOR CARRYING OUT THE INVENTION

Referring now to FIG. 1 to FIG. 13, one embodiment of the data division method and apparatus according to the present invention will be described in detail.

Figure 1:
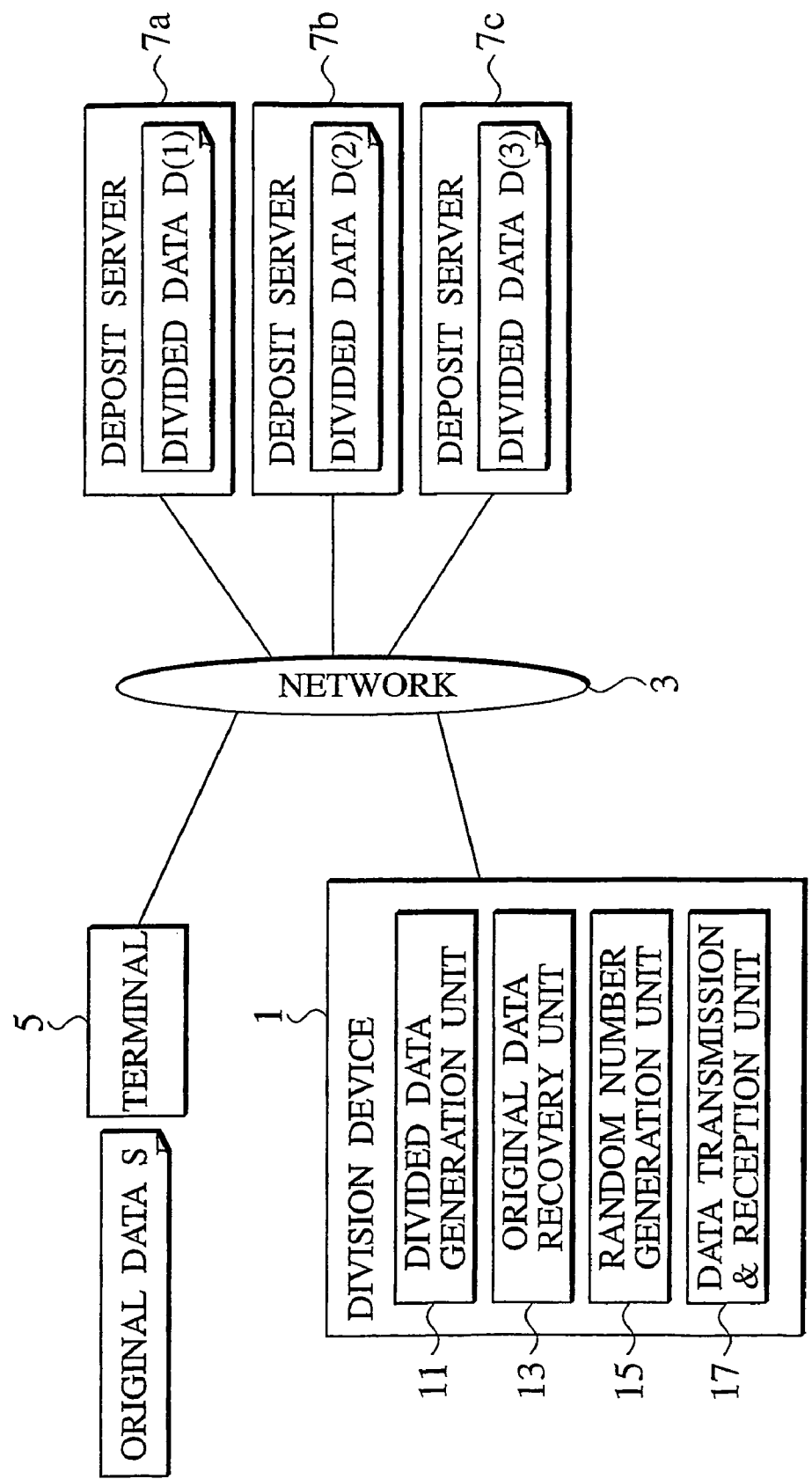
FIG. 1 is a block diagram showing a system configuration including a data division device for realizing a data division method according to one embodiment of the present invention.

FIG. 1 shows a configuration of a system including the data division device for realizing the data division method according to one embodiment of the present invention.

In this embodiment, a division device 1 is connected to a network 3, and operated to divide the original data S into divided data according to an original data division request from a terminal 5 which made an access to this network 3 and deposit a plurality of divided data into a plurality of deposit servers 7a, 7b and 7c through the network 3. Note that, in FIG. 1, the division device 1 divides the original data S from the terminal 5 into three divided data D(1), D(2) and D(3), and deposit them into the plurality of deposit servers 7a, 7b and 7c, respectively.

Also, the division device is operated to acquire the plurality of the divided data D(1), D(2) and D(3) from the deposit servers 7 through the network 3 according to an original data recovery request from the terminal 5 which made an access through the network 3, recover the original data S from the plurality of the divided data D(1), D(2) and D(3), and transmit the original data S to the terminal 5 through the network 3.

More specifically, the division device 1 comprises a divided data generation unit 11 for generating a plurality of divided data D from the original data S, an original data recovery unit 13 for recovering the original data S from the plurality of the divided data D, a random number generation unit 15 for generating random number R which is used in generating the plurality of the divided data D from the original data S, and a data transmission and reception unit 17 for transmitting the plurality of the divided data D generated by the divided data generation unit 11 to the plurality of the deposit servers 7a, 7b and 7c through the network 3, or receiving the plurality of the divided data D from the plurality of the deposit servers 7a, 7b and 7c through the network 3.

In the division and the recovery of the original data according to this embodiment, the original data is divided into the divided data in a desired number of division according to a desired processing unit bit length, and this processing unit bit length can be set to an arbitrary value. Also, the original data is partitioned into original partial data of the processing unit bit length, and divided partial data in a number less than the number of division by one are generated from each original partial data, so that when the bit length of the original data is not an integer multiple of (number of division−1) times the processing unit bit length, the bit length of the original data is adjusted to become an integer multiple of (number of division−1) times the processing unit bit length by filling up the tail of the original data by 0, for example.

Also, the random number mentioned above is generated by the random number generation unit 15 as (number of division−1) sets of random number partial data having a bit length equal to the processing unit bit length, in correspondence to (number of division−1) sets of the original partial data. Namely, the random number is generated and partitioned by the processing unit bit length as (number of division−1) sets of the random number partial data having a bit length equal to the processing: unit bit length. In addition, the original data are divided into the divided data in the desired number of division according to the processing unit bit length, and each one of these divided data is also generated as (number of division−1) sets of divided partial data having a bit length equal to the processing unit bit length in correspondence to (number of division−1) sets of the original partial data. Namely, each one of the divided data is generated and partitioned by the processing unit bit length as (number of division−1) sets of the divided partial data having a bit length equal to the processing unit bit length.

Note that, in the following description, the above described original data, random number, divided data, number of division and processing unit bit length will be denoted as S, R, D, n and b, respectively, and variables i (=1 to n) and j (=1 to n−1)

will be used as variables for indicating one of a plurality of data or random numbers, each one of (number of division n−1) sets of the original partial data, (number of division n−1) sets of the random number partial data, and n sets of the divided data D will be denoted as S(j), R(j) and D(j), respectively, and (n−1) sets of divided partial data that constitute each divided data D(i) will be denoted as D(i, j). Namely, S(j) denotes the j-th original partial data in the case where the original data S is partitioned by the processing unit bit length from the top and the resulting original partial data are sequentially numbered.

Using these notations, the original data, the random number data, the divided data, and their constituents, i.e. the original partial data, the random number partial data and the divided partial data, can be expressed as follows.

$$\text{Original data } S = (n-1) \text{ sets of original partial data } S(j)$$
$$= S(1), S(2), \cdots, S(n-1)$$

$$\text{Random number } R = (n-1) \text{ sets of random number partial data } R(j)$$
$$= R(1), R(2), \cdots, R(n-1)$$

$$n \text{ sets of divided data} = D(1), D(2), \cdots, D(n)$$

$$\text{Each divided partial data } D(i, j) = D(1, 1), D(1, 2), \cdots, D(1, n-1)$$
$$D(2, 1), D(2, 2), \cdots, D(2, n-1)$$
$$\cdots \quad \cdots \quad \cdots$$
$$D(n, 1), D(n, 2), \cdots, D(n, n-1)$$

$(i = 1 \text{ to } n), \ (j = 1 \text{ to } n-1)$

This embodiment is characterized by realizing the division of the original data by carrying out the exclusive OR (XOR) calculation of the original partial data and the random number partial data with respect to the plurality of partial data in the processing unit bit length as described above, or more specifically, by using a definition formula formed by the exclusive OR (XOR) calculation of the original partial data and the random number partial data. In contrast to the above described conventional method using the polynomial and the residue calculation for the data division processing, this embodiment uses the exclusive OR (XOR) calculation which is a bit calculation suitable for the computer processing so that it does not require a high speed and high performance calculation processing power, the divided data can be generated for a large capacity data by repeating the simple calculation processing, and the memory capacity required for maintaining the divided data becomes smaller than the capacity that is linearly proportional to the number of division. In addition, the divided data can be generated by the stream processing in which the calculation processing is carried out sequentially from the top of the data in units of a prescribed arbitrary length.

Note that the exclusive OR (XOR) calculation used in this embodiment will be denoted by a symbol "*" in the following description, and the calculation results according to the calculation rules for different bits of this exclusive OR calculation are as follows.

calculation result of 0*0 is 0
calculation result of 0*1 is 1
calculation result of 1*0 is 1
calculation result of 1*1 is 0

Also, in the XOR calculation, the commutativity and the associativity hold. Namely, it is mathematically proven that the following equations hold.

$$a*b = b*a$$

$$(a*b)*c = a*(b*c)$$

In addition, a*a=0 and a*0=0*a=a also hold. Here, a, b and c represent bit sequences of the same length, and 0 represents a bit sequence consisting of "0" which has the same length as a, b and c.

Next, the operation in this embodiment will be described with references to the drawings. First, the definition of symbols used in the flow charts of FIGS. 2, 5, 8 and 9 will be described.

$$(1) \prod_{i=1}^{n} A(i) \text{ indicates } A(1)*A(2)*\cdots*A(n)$$

(2) c(j,i,k) is an (n−1)×(n−1) matrix which is defined as a value of the i-th row and the k-th column of U[n−1,n−1]×(P[n−1,n−1]^(j−1)

Then Q(j,i,j) is defined as follows.

$$Q(j,i,k) = R((n-1) \times m + k) \text{ when } c(j,i,k)=1$$

$$Q(j,i,k) = 0 \text{ when } c(j,i,k)=0$$

where m≧0 is an integer.

(3) U[n,n] is an n×n matrix with u(i,j) indicating a value of the i-th row and the j-th column given by:

$$u(i,j)=1 \text{ when } i+j \leq n+1$$

$$u(i,j)=0 \text{ when } i+j > n+1$$

and this matrix will be referred to as an "upper triangular matrix". More specifically, this is a matrix such as the following.

$$U[3,3] = \begin{pmatrix} 1 & 1 & 1 \\ 1 & 1 & 0 \\ 1 & 0 & 0 \end{pmatrix}$$

$$U[4,4] = \begin{pmatrix} 1 & 1 & 1 & 1 \\ 1 & 1 & 1 & 0 \\ 1 & 1 & 0 & 0 \\ 1 & 0 & 0 & 0 \end{pmatrix}$$

(4) P[n,n] is an n×n matrix with p(ij) indicating a value of the i-th row and the j-th column given by:

$$p(i,j)=1 \text{ when } j=i+1$$

$$p(i,j)=1 \text{ when } i=1, j=1$$

$$p(i,j)=0 \text{ otherwise}$$

and this matrix will be referred to as an "rotation matrix".

More specifically, this is a matrix such as the following.

$$P[3,3] = \begin{pmatrix} 0 & 1 & 0 \\ 0 & 0 & 1 \\ 1 & 0 & 0 \end{pmatrix}$$

$$P[4,4] = \begin{pmatrix} 0 & 1 & 0 & 0 \\ 0 & 0 & 1 & 0 \\ 0 & 0 & 0 & 1 \\ 1 & 0 & 0 & 0 \end{pmatrix}$$

When this rotation matrix is multiplied to another matrix from the right side, this rotation matrix has an effect of shifting the first column to the second column, the second column to the third column, n−1-th column to the n-th column, and n-th column to the first column in that another matrix. In other words, when the matrix P is multiplied to another matrix from the right side for plural times, each column of that another matrix will be "rotated" towards the right direction as much as that plural times.

(5) When A and B are n×n matrices, A×B indicates a product of matrices A and B. The calculation rule for components of the matrices is the same as the ordinary mathematics.

(6) When A is an n×n matrix and i is an integer, A^i indicates a product of i sets of the matrix A. Also, A^0 indicates a unit matrix E.

(7) The unit matrix E[n,n] is an n×n matrix with a value e(i,j) of the i-th row and j-th column given by:

$e(i,i)=1$ when $i=j$ $e(i,j)=0$ otherwise

More specifically, this is a matrix such as the following.

$$E\{3,3\} = \begin{pmatrix} 1 & 0 & 0 \\ 0 & 1 & 0 \\ 0 & 0 & 1 \end{pmatrix}$$

$$E[4,4] = \begin{pmatrix} 1 & 0 & 0 & 0 \\ 0 & 1 & 0 & 0 \\ 0 & 0 & 1 & 0 \\ 0 & 0 & 0 & 1 \end{pmatrix}$$

When A is an arbitrary n×n matrix, the unit matrix has the property that A×E=E×A=A.

Figure 2:
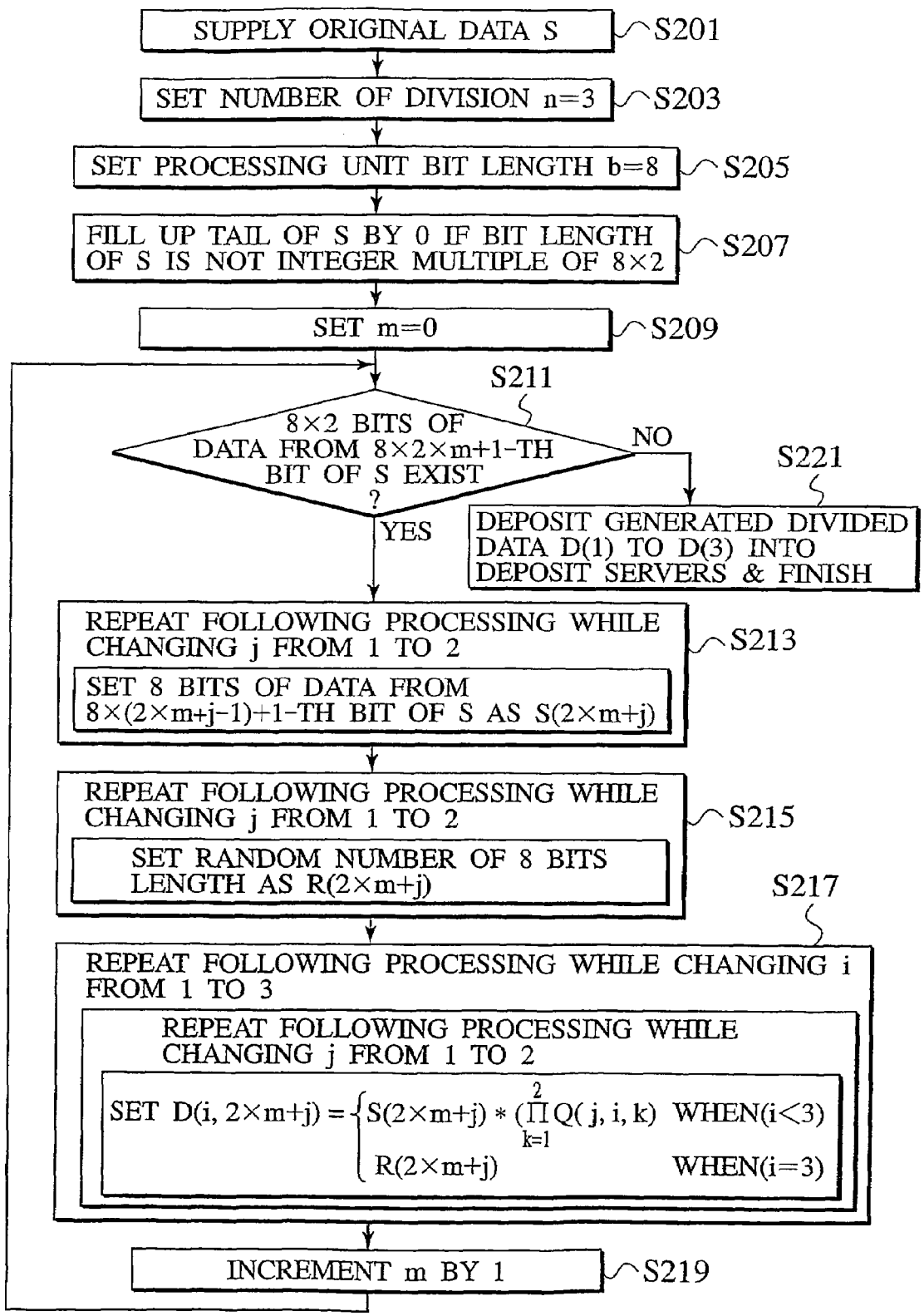
FIG. 2 is a flow chart showing a division processing by the data division device shown in FIG. 1, in the case where a number of division is three.

Next, with references to FIGS. 2, 3 and 4, the processing for dividing the original data S will be described.

The user of the division device 1 of this embodiment makes an access to the division device 1 from the terminal 5 through the network 3 and transmits the original data S to the division device 1. The the data transmission and reception unit 17 of the division device 1 receives the original data S from the terminal 5 and supplies it to the division device 1 (step S201 of FIG. 2). Note that, in this example, the original data S is assumed to be 16 bits given by "10110010 00110111".

Next, the user specifies the number of division n=3 to the division device 1 (step S203). This number of division n may be a value predetermined by the division device 1. Note that the three divided data generated by the division device 1 according to this number of division n=3 will be denoted as D(1), D(2) and D(3). These divided data D(1), D(2) and D(3) are all data with the 16 bits length which is the same bit length as the original data.

Then, the processing unit bit length b to be used in dividing the original data S is determined as 8 bits, and the random number R in 16 bits which is the same bit length as the original data S is generated at the random number generation unit 15 (step S205). This processing unit bit length b may be specified by the user from the terminal 5 to the division device 1, or may be a value predetermined by the division device 1. Note that the processing unit bit length b can be an arbitrary number of bits but here it is assumed to be 8 bits by which the original data S is divisible. Consequently, when the above described original data S "10110010 00110111" in 16 bits is divided by the processing unit bit length of 8 bits, the resulting two original partial data S(1) and S(2) are given by "10110010" and "00110111".

Next, at the step S207, whether the bit length of the original data S is an integer multiple of 8×2 or not is judged, and if it is not an integer multiple, the tail of the original data S is filled up by 0 to make it an integer multiple of 8×2. Note that the division processing in the case where the processing unit bit length b is set to be 8 bits and the number of division n is set to be 3 as in this example is valid not only for the original data S with the bit length of 16 bits, but also the original data S with the bit length which is an integer multiple of the processing unit bit length b×(number of division n−1)=8×2.

Next, at the step S209, a variable m which indicates an integer multiple mentioned above is set to 0. Note that m is equal to 0 in the case where the original data S has the bit length equal to the processing unit bit length b×(number of division n−1)=8×2=16 bits as in this example, but m is equal to 1 in the case of 32 bits which is twice as long, and m is equal to 2 in the case of 48 bits which is three times as long.

Next, whether 8×2 bits of data from the 8×2×m+1-th bit of the original data S exist or not is judged (step S211). This judges whether the next 16 bits exists in the original data S after the division processing starting from the step S211 is carried out for the processing unit bit length b×(number of division−1)=8×2=16 bits of the original data S specified by the variable m or not. In the case where the original data S is 16 bits as in this example, when the division processing starting from the step S211 is carried out once for the original data S in 16 bits, the variable m is incremented by 1 at the step S219 to be described below, but data starting from the 17-th bit that correspond to the case of the variable m=1 do not exist in the original data S of this example, so that the processing proceeds from the step S211 to the step S221, but currently the variable m is 0 so that the 8×2×m+1-th bit of the original data S is 8×2×0+1=1 and 8×2 bits of data from the first bit exists in the original data S in 16 bits, and therefore the processing proceeds to the step S213.

At the step S213, the 8 bits (=the processing unit bit length) of data from the 8×(2×m+j−1)+1-th bit of the original data S is set as the original partial data S(2×m+j) while changing the variable j from 1 to 2 (=number of division n−1), such that two (=number of division n−1) sets of the original partial data S(1) and S(2) resulting from the division of the original data S by the processing unit bit length are generated as follows.

Original data S=S(1), S(2)

First original partial data S(1)="10110010"

Second original partial data S(2)="00110111"

Next, the random number with a length equal to 8 bits generated from the random number generation unit 15 is set as a random number partial data R(2×m+j) while changing the variable j from 1 to 2 (=number of division n−1), such that two (=number of division n−1) sets of the random number partial data R(1) and R(2) resulting from the division of the random number R by the processing unit bit length are generated as follows (step S215).

Random number R=R(1), R(2)
First random number partial data R(1)="10110001"
Second random number partial data R(2)="00110101"

Next, at the step S217, each divided partial data D(i,2×m+j) that constitutes each one of the plurality of the divided data D(i) is generated according to the definition formula for generating the divided data as shown in the step S217 which is defined by the exclusive OR of the original partial data and the random number partial data, while changing the variable i from 1 to 3 (=number of division n) and changing the variable j from 1 to 2 (=number of division n−1) for each variable i. As a result, the following divided data D are generated.

Divided data D
three divided data D(i)=D(1), D(2), D(3)
First divided data D(1)
=two divided partial data D(1,j)=D(1,1), D(1,2)
="00110110", "10110011"
Second divided data D(2)
=two divided partial data D(2,j)=D(2,1), D(2,2)
="00000011", "00000010"
Third divided data D(3)
=two divided partial data D(3,j)=D(3,1), D(3,2)
="10110001", "00110101"

Note that the definition formula for generating each divided partial data D(i,j) shown in the step S217 becomes the specific form described in the table shown in FIG. 4 in the case where the number of division n=3 as in this example. From the table shown in FIG. 4, it can be seen that the definition formula for generating the divided partial data D(1,1) is S(1)*R(1)*R(2), the definition formula for generating the divided partial data D(1,2) is S(2)*R(1)*R(2), the definition formula for generating the divided partial data D(2,1) is S(1)*R(1), the definition formula for generating the divided partial data D(2,2) is S(2)*R(2), the definition formula for generating the divided partial data D(3,1) is R(1), and the definition formula for generating the divided partial data D(3,2) is R(2). The table shown in FIG. 4 also shows a general definition formula in the case where m>0 is an arbitrary integer.

After generating the divided data D in this way for the case where the variable m=0 which indicates the integer multiple, the variable m is incremented by 1 (step S219), and the processing returns to the step S211, where the similar division processing for data starting from the 17-th bit of the original data S corresponding to the variable m=1 is attempted, but in this example the original data S is 16 bits and data starting from the 17-th bit do not exist, so that the processing proceeds from the step S211 to the step S221, where the divided data D(1), D(2) and D(3) generated as described above are transmitted to the deposit servers 7*a*, 7*b* and 7*c* respectively, from the data transmission and reception unit 17 of the division device 1 through the network 3, such that they are deposited in the respective deposit servers 7 and then the division processing is finished.

Now, the divided data generation processing using the definition formula shown in the step S217 of FIG. 2 described above, or more specifically the divided data generation processing in the case where the number of division n=3, will be described.

First, in the case where the variable m=0 that indicates the integer multiple, from the definition formula shown in the step S217, the divided partial data D(i,2×m+j)=D(i,j) (i=1 to 3, j=1 to 2) that constitute each one of the divided data D(i)=D(1) to D(3) are as follows.

$$D(1,1)=S(1)*Q(1,1,1)*Q(1,1,2)$$

$$D(1,2)=S(2)*Q(2,1,1)*Q(2,1,2)$$

$$D(2,1)=S(1)*Q(1,2,1)*Q(1,2,2)$$

$$D(2,2)=S(2)*Q(2,2,1)*Q(2,2,2)$$

$$D(3,1)=R(1)$$

$$D(3,2)=R(2)$$

Q(j,i,k) that is contained in four equations among the above described six equations is given as follows. Namely, when c(j,i,k) is a value of the i-th row and the k-th column of 2×2 matrix U[2,2]×(P[2,2]^(j−1)), Q(j,i,k) is given by:

$$Q(j,i,k)=R(k) \text{ when } c(j,i,k)=1$$

$$Q(j,i,k)=0 \text{ when } c(j,i,k)=1$$

Thus, when j=1, $$U[2,2] \times (P[2,2])^{\wedge}(j-1) = U[2,2] \times (P[2,2])^{\wedge}0$$
$$= U[2,2] \times E[2,2]$$
$$= U[2,2]$$
$$= \begin{pmatrix} 1 & 1 \\ 1 & 0 \end{pmatrix}$$

and when j=2, $$U[2,2] \times (P[2,2])^{\wedge}(j-1) = U[2,2] \times (P[2,2])^{\wedge}1$$
$$= U[2,2] \times P[2,2]$$
$$= \begin{pmatrix} 1 & 1 \\ 1 & 0 \end{pmatrix} \times \begin{pmatrix} 0 & 1 \\ 1 & 0 \end{pmatrix}$$
$$= \begin{pmatrix} 1 & 1 \\ 0 & 1 \end{pmatrix}$$

Using these, each divided partial data D(i,j) is generated by the following definition formula.

$$D(1,1) = S(1) * Q(1,1,1) * Q(1,1,2)$$
$$= S(1) * R(1) * R(2)$$
$$D(1,2) = S(2) * Q(2,1,1) * Q(2,1,2)$$
$$= S(2) * R(1) * R(2)$$
$$D(2,1) = S(1) * Q(1,2,1) * Q(1,2,2)$$
$$= S(1) * R(1) * 0$$
$$= S(1) * R(1)$$
$$D(2,2) = S(2) * Q(2,2,1) * Q(2,2,2)$$
$$= S(2) * 0 * R(2)$$
$$= S(2) * R(2)$$

Figure 3:
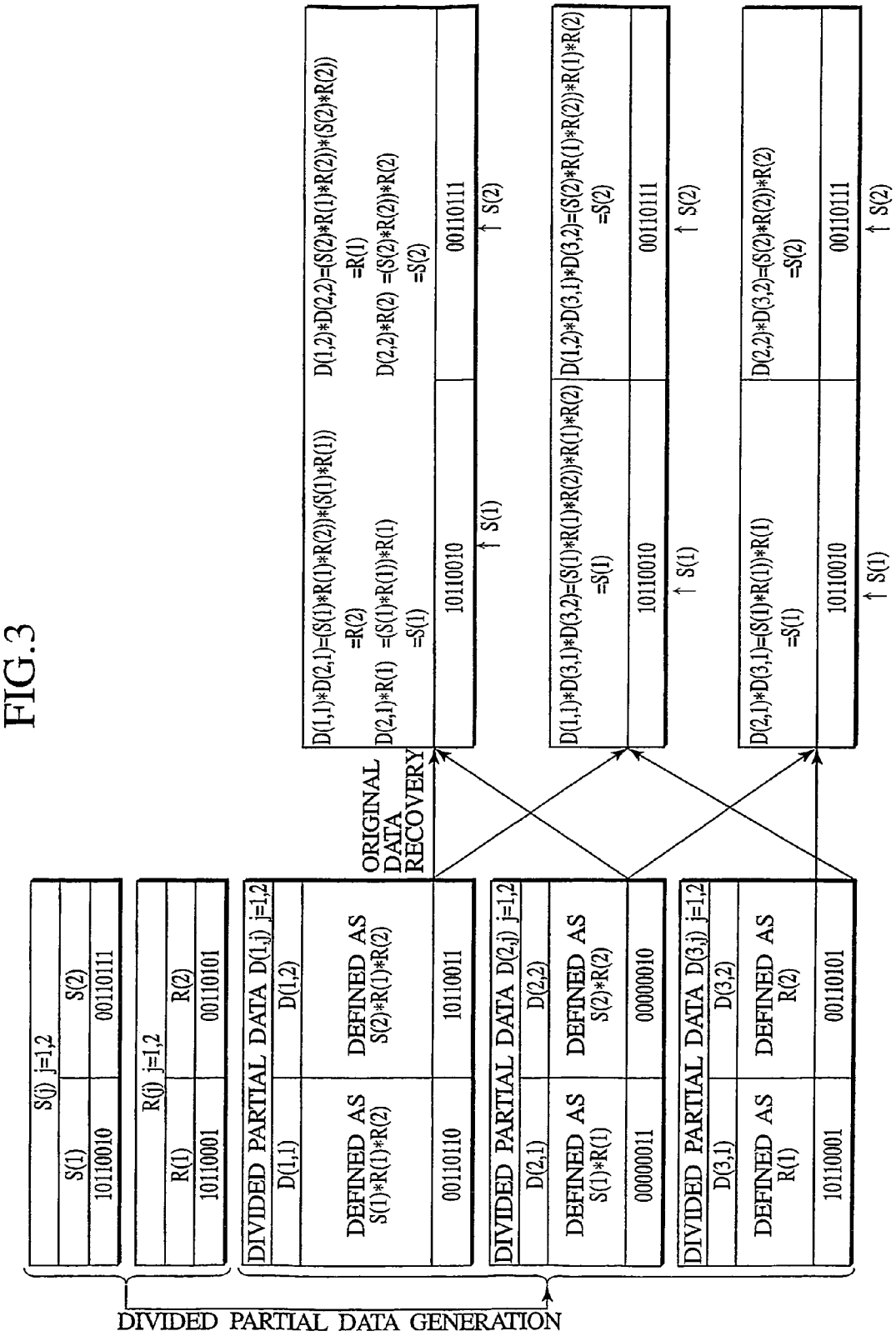
FIG. 3 is a diagram showing outline of a division processing and a recovery processing in the case of division into three according to one embodiment of the present invention.

The above described definition formula for generating each divided partial data D(i,j) is also shown in FIG. 3.

FIG. 3 is a table that shows each data and the definition formula in the case dividing the original data S in 16 bits into three (the number of division n=3) by using the processing unit bit length equal to 8 bits as described above, and the calculation formula in the case of recovering the original data S from the divided partial data.

Now, the process and the general form of the definition formula for generating the divided data D(1), D(2) and D(3) and the divided partial data D(1,1), D(1,2), D(2,1), D(2,2), D(3,1) and D(3,2) will be described.

First, for the first divided data D(1), the first divided partial data D(1,1) is defined by the above described formula S(1)*R(1)*R(2), and the second divided partial data D(1,2) is defined by the above described formula S(2)*R(1)*R(2). Note that the general form is S(j)*R(j)*R(j+1) for D(1,j) and S(j+1)*R(j)*R(j+1) for the D(1,j+1) (where j is assumed to be an odd number). By the calculation according to the definition formula, D(1,1) is "00110110", D(1,2) is "10110011", so that D(1) is "00110110 10110011". Note that the general form of the definition formula is shown in FIG. 4.

Also, for the second divided data D(2), the first divided partial data D(2,1) is defined by the above described formula S(1)*R(1), and the second divided partial data D(2,2) is defined by the above described formula S(2)*R(2). Note that the general form is S(j)*R(j) for D(2,j) and S(j+1)*R(j+1) for the D(2,j+1) (where j is assumed to be an odd number). By the calculation according to the definition formula, D(2.1) is "00000011", D(2,2) is "00000010", so that D(2) is "00000011 00000010".

Also, for the third divided data D(3), the first divided partial data D(3,1) is defined by the above described formula R(1), and the second divided partial data D(3,2) is defined by the above described formula R(2). Note that the general form is R(j) for D(3,j) and R(j+1) for the D(3,j+1) (where j is assumed to be an odd number). By the calculation according to the definition formula, D(3.1) is "10110001" and D(3,2) is "00110101", so that D(3) is "10110001 00110101".

Note that, in the above description, the bit length of S, R, D(1), D(2) and D(3) is assumed to be 16 bits, but it is possible to generate the divided data D(1), D(2) and D(3) from the original data S of any bit length by repeating the above described division processing from the top of the data. Also, the processing unit bit length b can be arbitrary, and it is applicable to the original data S of arbitrary bit length by repeating the above described division processing for each length of b×2 sequentially from the top of the original data S, or more specifically to the original data S with a bit length which is an integer multiple of the processing unit bit length b×2. Note that if the bit length of the original data S is not an integer multiple of the processing unit bit length b×2, it is still possible to apply the division processing of this embodiment as described above by adjusting the bit length of the original data S to be an integer multiple of the processing unit bit length b×2 by filling up the tail of the original data S by 0, for example.

Next, with reference to a table shown on a right side of FIG. 3, the processing for recovering the original data from the divided data will be described.

First, the user makes an access to the division device 1 from the terminal 5 through the network 3, and requests the recovery of the original data S through the data transmission and reception unit 17 of the division device 1. Upon receiving this recovery request for the original data S, as the division device 1 knows that the divided data D(1), D(2) and D(3) corresponding to this original data S are deposited in the deposit servers 7a, 7b and 7c, the division device 1 acquires the divided data D(1), D(2) and D(3) from the deposit servers 7a, 7b and 7c through the network 3, and recovers the original data S from the acquired divided data D(1), D(2) and D(3) as follows.

First, the first original partial data S(1) can be generated from the divided data D(2,1) and D(3,1) as follows.

$$D(2,1) * D(3,1) = (S(1) * R(1)) * R(1)$$
$$= S(1) * (R(1) * R(1))$$
$$= S(1) * 0$$
$$= S(1)$$

More specifically, D(2,1) is "00000011" and D(3,1) is "10110001" so that S(1) becomes "10110010".

Also, the second original partial data S(2) can be generated from the other divided partial data as follows.

$$D(2,2) * D(3,2) = (S(2) * R(2)) * R(2)$$
$$= S(2) * (R(2) * R(2))$$
$$= S(2) * 0$$
$$= S(2)$$

More specifically, D(2,2) is "00000010" and D(3,2) is "00110101" so that S(2) becomes "00110111".

In general, when j is an odd number, the relationship of:

$$D(2,j) * D(3,j) = (S(j) * R(j)) * R(j)$$
$$= S(j) * (R(j) * R(j))$$
$$= S(j) * 0$$
$$= S(j)$$

holds, so that S(j) can be obtained by calculating D(2,j)*D(3,j).

Also, in general, when j is an odd number, the relationship of:

$$D(2, j+1) * D(3, j+1) = (S(j+1) * R(j+1)) * R(j+1)$$
$$= S(j+1) * (R(j+1) * R(j+1))$$
$$= S(j+1) * 0$$
$$= S(j+1)$$

holds, so that S(j+1) can be obtained by calculating D(2,j+1)*D(3,j+1).

Next, the case of recovering the original data S by acquiring D(1) and D(3) is as follows. Namely, the relationship of:

$$D(1,1) * D(3,1) * D(3,2) = (S(1) * R(1) * R(2)) * R(1) * R(2)$$
$$= S(1) * (R(1) * R(1)) * (R(2) * R(2))$$
$$= S(1) * 0 * 0$$
$$= S(1)$$

holds, so that S(1) can be obtained by calculating D(1,1)*D(3,1)*D(3,2). More specifically, D(1,1) is "00110110", D(3,1) is "10110001" and D(3,2) is "00110101" so that S(1) becomes "10110010".

Similarly, the relationship of:

$$D(1, 2) * D(3, 1) * D(3, 2) = (S(2) * R(1) * R(2)) * R(1) * R(2)$$
$$= S(2) * (R(1) * R(1)) * (R(2) * R(2))$$
$$= S(2) * 0 * 0$$
$$= S(2)$$

holds, so that S(2) can be obtained by calculating D(1,2)*D(3,1)*D(3,2). More specifically, D(1,2) is "10110011", D(3,1) is "10110001" and D(3,2) is "00110101" so that S(2) becomes "00110111".

In general, when j is an odd number, the relationship of:

$$D(1, j) * D(3, j) * D(3, j+1) = (S(j) * R(j) * R(j+1)) *$$
$$R(j) * R(j+1)$$
$$= S(j) * (R(j) * R(j)) *$$
$$(R(j+1) * R(j+1))$$
$$= S(j) * 0 * 0$$
$$= S(j)$$

holds, so that S(i) can be obtained by calculating D(1,j)*D(3,j)*D(3,j+1).

Also, in general, when j is an odd number, the relationship of:

$$D(1, j+1) * D(3, j) * D(3, j+1) = (S(j+1) * R(j) * R(j+1)) *$$
$$R(j) * R(j+1)$$
$$= S(j+1) * (R(j) * R(j)) *$$
$$(R(j+1) * R(j+1))$$
$$= S(j+1) * 0 * 0$$
$$= S(j+1)$$

holds, so that S(j+1) can be obtained by calculating D(1,j+1)*D(3,j)*D(3,j+1).

Next, the case of recovering the original data S by acquiring the divided data D(1) and D(2) is as follows.

Namely, the relationship of:

$$D(1, 1) * D(2, 1) = (S(1) * R(1) * R(2)) * (S(1) * R(1))$$
$$= (S(1) * S(1)) * (R(1) * R(1)) * R(2)$$
$$= 0 * 0 * R(2)$$
$$= R(2)$$

holds, so that R(2) can be obtained by calculating D(1,1)*D(2,1). More specifically, D(1,1) is "00110110" and D(2,1) is "00000011" so that R(2) becomes "00110101".

Similarly, the relationship of:

$$D(1, 2) * D(2, 2) = (S(2) * R(1) * R(2)) * (S(2) * R(2))$$
$$= (S(2) * S(2)) * R(1) * (R(2) * R(2))$$
$$= 0 * R(1) * 0$$
$$= R(1)$$

holds, so that R(1) can be obtained by calculating D(1,2)*D(2,2). More specifically, D(1,2) is "10110011", D(2,2) is "00000010" so that R(1) becomes "10110001".

Using these R(1) and R(2), S(1) and S(2) are obtained as follows. Namely, the relationship of:

$$D(2, 1) * R(1) = (S(1) * R(1)) * R(1)$$
$$= S(1) * (R(1) * R(1))$$
$$= S(1) * 0$$
$$= S(1)$$

holds, so that S(1) can be obtained by calculating D(2,1)*R(1). More specifically, D(2,1) is "00000011" and R(1) is "10110001" so that S(1) becomes "10110010".

Similarly, the relationship of:

$$D(2, 2) * R(2) = (S(2) * R(2)) * R(2)$$
$$= S(2) * (R(2) * R(2))$$
$$= S(2) * 0$$
$$= S(2)$$

holds, so that S(2) can be obtained by calculating D(2,2)*R(2). More specifically, D(2,2) is "00000010", R(2) is "00110101" so that S(2) becomes "00110111".

In general, when j is an odd number, the relationship of:

$$D(1, j) * D(2, j) = (S(j) * R(j) * R(j+1)) * (S(j) * R(j))$$
$$= (S(j) * S(j)) * (R(j) * R(j)) * R(j+1)$$
$$= 0 * 0 * R(j+1)$$
$$= R(j+1)$$

holds, so that R(j+1) can be obtained by calculating D(1,j)*D(2,j).

Also, in general, when j is an odd number, the relationship of:

$$D(1, j+1) * D(2, j+1) = (S(j+1) * R(j) * R(j+1)) *$$
$$(S(j+1) * R(j+1))$$
$$= (S(j+1) * S(j+1)) *$$
$$R(j) * (R(j+1) * R(j+1))$$

-continued $$= 0 * R(j) * 0$$
$$= R(j)$$

holds, so that R(j) can be obtained by calculating D(1,j+1)*D(2,j+1).

Using these R(j) and R(j+1), S(j) and S(j+1) are obtained as follows. Namely, the relationship of:

$$D(2, j) * R(j) = (S(j) * R(j)) * R(j)$$
$$= S(j) * (R(j) * R(j))$$
$$= S(j) * 0$$
$$= S(j)$$

holds, so that S(j) can be obtained by calculating D(2,j)*R(j).

Similarly, the relationship of:

$$D(2, j+1) * R(j+1) = (S(j+1) * R(j+1)) * R(j+1)$$
$$= S(j+1) * (R(j+1) * R(j+1))$$
$$= S(j+1) * 0$$
$$= S(j+1)$$

holds, so that S(j+1) can be obtained by calculating D(2,j+1)*R(j+1).

As described above, when the divided data are generated by repeating the division processing from the top of the original data according to the processing unit bit length b, it is possible to recover the original data by using two divided data among three divided data, without using all of the three divided data D(1), D(2) and D(3).

As another embodiment of the present invention, it is possible to carry out the original data division processing by using the random number R with a bit length shorter than a bit length of the original data S.

Namely, the random number R is assumed to be data with the same bit length as S, D(1), D(2) and D(3) in the above, but the random number R can have a bit length shorter than a bit length of the original data S and this random number R with a shorter bit length can be used repeatedly in the generation of the divided data D(1), D(2) and D(3).

Note that the divided data D(3) is generated solely from the random number R, so that there is no need to deposit the random number R repeatedly for the divided data D(3). For example, suppose that the bit length of the original data S is 1600 bits (200 bytes), and the random number is repetition of arbitrarily selected 160 bits (20 bytes) data. In other words, R(1) to R(20) are generated randomly, and R(21) to R(200) are set such that R(21)=R(1), R(22)=R(2), ..., R(40)=R(20), R(41)=R(1), R(42)=R(2), ..., R(60)=R(20), R(61)=R(1), R(62)=R(2), ..., R(80)=R(20), ..., R(181)=R(1), R(182)=R(2), ..., R(200)=R(20).

In the earlier description, D(3) is generated by defining the divided partial data D(3,j) as the random number partial data R(j), but in this case it is sufficient to store only up to D(3,20).

Namely, the length of D(3) becomes 1/10 of D(1) and D(2). Consequently, the total amount of data to be stored has been three times the data amount of the original data S in the previous embodiment, but in this embodiment, this total amount can be reduced to 2.1 times the data amount of the original data S. The length of the data in the repeated portion of the random number R should preferably be appropriately long enough, because if it is too short, the random number R may possibly be decoded from D(1) or D(2) alone.

In this embodiment, the pseudo-random number generation algorithm is used in order to generate the random number R, for example. There are two types of the random number including a truly random number which is generated by using a physical phenomenon in nature, and a pseudo-random number which is generated by using a computer algorithm or the like. The truly random number can be generated by throwing dice many times or utilizing a physical phenomenon such as noises, but it requires too much time and effort so that the pseudo-random number is used instead. The pseudo-random number is generated from a seed (information to becomes a seed of the random number generation) of appropriate length according to a deterministic algorithm. The longer random number can be obtained from a shorter seed, for example. The length of the seed can be 128 bits, 160 bits or longer, for example. Although it is generated by the deterministic algorithm, the properties required for the random number such as the statistical uniformity and the non-correlatedness are satisfied to sufficient degrees. The concrete examples of the standardized pseudo-random number includes ANSI X9.42 and FIPS 186-2 (see "http://www.ipa.go.jp/security/enc/CRYPTREC/fy15/cryptrec20030425_spec01.html", for example).

By using these, it is possible to generate a sequence of a long pseudo-random numbers from an input of the random number generation seed.

For example, the random number R with a length equal to the bit length of the original data S is generated by inputting a seed of 160 bits, D(1) and D(2) are generated from S and R as described above, and the seed of 160 bits is stored and managed for D(3) rather than storing R. In this way, the number of bits that need to be stored and managed for D(3) can be reduced to 160 bits even when the bit length of the original data S becomes long, so that the total amount of data to be stored can be suppressed. In the case of recovering the original data S, the random number R with a length equal to the bit length of the original data S is generated again from the seed of 160 bits stored for D(3), and the original data S can be recovered by using this R and D(1) or D(2) as described above.

The embodiments described above are directed to the case where the original data is divided into three, and the original data can be recovered from two divided data, but it is also possible to set the number of division n to be greater than 3, and recover the original data from a number of divided data less than n.

Figure 5:
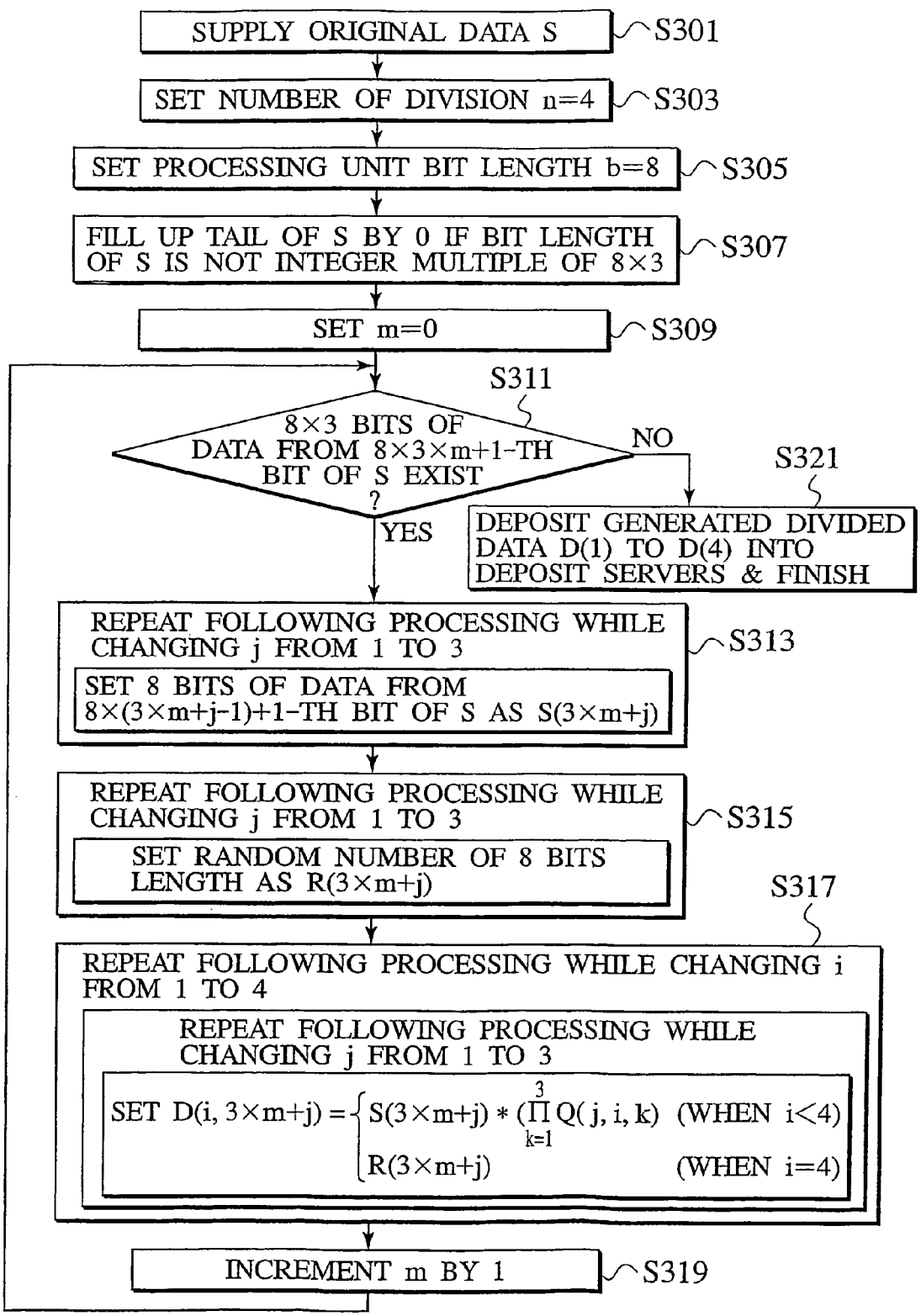
FIG. 5 is a flow chart showing a division processing by the data division device shown in FIG. 1, in the case where a number of division is four.

As an example, the division processing in the case where the number of division n=4 such that the original data is divided into four divided data will be described with references to FIG. 5 and FIG. 6.

First, the user transmits the original data S by making an access to the division device 1 from the terminal 5, and the data transmission and reception unit 17 of the division device 1 receives the original data S from the terminal 5 and supplies it to the division device 1 (step S301). Then, the user specifies the number of division n as 4 to the division device 1 from the terminal 5 (step S303). This number of division n may be a value predetermined by the division device 1. Also, the processing unit bit length b is determined as 8 bits, for example (step S305). Next, whether the bit length of the original data S is an integer multiple of 8×3 or not is judged, and if it is not an integer multiple, the tail of the original data S is filled up by 0 (step S307). Also, a variable m which indicates an integer multiple is set to 0 (step S309).

Next, whether 8×3 bits of data from the 8×3×m+1-th bit of the original data S exist or not is judged (step S311). Note that this example is directed to the case where the original data S is data with the bit length equal to 8×3=24 bits.

As a result of the judgement of the step S311, the original data S of this example is data in 8×3=24 bits and data starting from 25-th bit that corresponds to 8×3×m+1-th bit in the case of m=1 do not exist, so that the processing will proceed from the step S311 to the step S321 when m=1, but this currently the variable m is 0 so that 8×3×m+1-th bit is 8×3×0+1=1 and 8×3 bits of data from the first bit in the original data S in 24 bits exist, and the processing proceeds to the step S313.

At the step S313, 8 bits (=the processing unit bit length) of data from 8×(3×m+j−1)+1-th bit of the original data S is set as the original partial data S(3×m+j) while changing the variable j from 1 to 3 (=number of division n−1), such that three sets of the original partial data S(1), S(2) and S(3) resulting from the division of the original data S by the processing unit bit length are generated.

Next, the random number with a length equal to 8 bits generated by the random number generation unit 15 is set as the random number partial data R(3×m+j) while changing the variable j from 1 to 3, such that three sets of the random number partial data R(1), R(2) and R(3) resulting from the division of the random number R by the processing unit bit length are generated (step S315).

Next, at the step S317, each divided partial data D(i,3×m+j) that constitutes each one of the plurality of the divided data D(i) is generated according to the definition formula for generating the divided data as shown in the step S317, while changing the variable i from 1 to 4 (=number of division n) and changing the variable j from 1 to 3 (=number of division n−1) for each variable i. As a result, the following divided data D are generated.

Divided data D
=four divided data D(i)=D(1), D(2), D(3), D(4)
First divided data D(1)
=three divided partial data D(1,j)
=D(1,1), D(1,2), D(1,3)
Second divided data D(2)
=three divided partial data D(2,j)
=D(2,1), D(2,2), D(2,3)
Third divided data D(3)
=three divided partial data D(3,j)
=D(3,1), D(3,2), D(3,3)
Fourth divided data D(4)
=three divided partial data D(4,j)
=D(4,1), D(4,2), D(4,3)

Note that the definition formula for generating each divided partial data D(i,j) shown in the step S317 becomes the specific form described in the table shown in FIG. 6 in the case where the number of division n=4 as in this example. From the table shown in FIG. 6, it can be seen that the definition formula for generating the divided partial data D(1,1) is S(1)*R(1)*R(2)*R(3), the definition formula for generating the divided partial data D(1,2) is S(2)*R(1)*R(2)*R(3), the definition formula for generating the divided partial data D(1,3) is S(3)*R(1)*R(2)*R(3), the definition formula for generating the divided partial data D(2,1) is S(1)*R(1)*R(2), the definition formula for generating the divided partial data D(2,2) is S(2)*R(2)*R(3), the definition formula for generating the divided partial data D(2,3) is S(3)*R(1)*R(3), the definition formula for generating the divided partial data D(3,1) is S(1)*R(1), the definition formula for generating the divided partial data D(3,2) is S(2)*R(2), the definition formula for generating the divided partial data D(3,3) is S(3)*R(3), the definition formula for generating the divided partial data D(4,1) is R(1), the definition formula for generating the divided partial data D(4,2) is R(2), and the definition formula for generating the divided partial data D(4,3) is R(3). The table shown in FIG. 6 also shows a general definition formula in the case where m>0 is an arbitrary integer.

After generating the divided data D in this way for the case where the variable m=0, the variable m is incremented by 1 (step S319), and the processing returns to the step S311, where the similar division processing for data starting from the 25-th bit of the original data S corresponding to the variable m=1 is attempted, but in this example the original data S is 24 bits and data starting from the 25-th bit do not exist, so that the processing proceeds from the step S311 to the step S321, where the divided data D(1), D(2), D(3) and D(4) generated as described above are transmitted to the deposit servers 7 respectively, from the data transmission and reception unit 17 of the division device 1 through the network 3, such that they are deposited in the respective deposit servers 7 and then the division processing is finished. Note that there are three deposit servers 7 shown in FIG. 1, but it is preferable to increase the deposit servers according to the number of division such that different divided data can be deposited into different deposit servers.

Now, the divided data generation processing using the definition formula shown in the step S317 of FIG. 5 described above, or more specifically the divided data generation processing in the case where the number of division n=4, will be described.

First, from the definition formula shown in the step S317, the divided partial data D(i,3×m+j) that constitute each one of the divided data D(i)=D(1) to D(4) are as follows.

$$D(1,3\times m+1)=S(3\times m+1)*Q(1,1,1)*Q(1,1,2)*Q(1,1,3)$$

$$D(1,3\times m+2)=S(3\times m+2)*Q(2,1,1)*Q(2,1,2)*Q(2,1,3)$$

$$D(1,3\times m+3)=S(3\times m+3)*Q(3,1,1)*Q(3,1,2)*Q(3,1,3)$$

$$D(2,3\times m+1)=S(3\times m+1)*Q(1,2,1)*Q(1,2,2)*Q(1,2,3)$$

$$D(2,3\times m+2)=S(3\times m+2)*Q(2,2,1)*Q(2,2,2)*Q(2,2,3)$$

$$D(2,3\times m+3)=S(3\times m+3)*Q(3,2,1)*Q(3,2,2)*Q(3,2,3)$$

$$D(3,3\times m+1)=S(3\times m+1)*Q(1,3,1)*Q(1,3,2)*Q(1,3,3)$$

$$D(3,3\times m+2)=S(3\times m+2)*Q(2,3,1)*Q(2,3,2)*Q(2,3,3)$$

$$D(3,3\times m+3)=S(3\times m+3)*Q(3,3,1)*Q(3,3,2)*Q(3,3,3)$$

$$D(4,3\times m+1)=R(3\times m+1)$$

$$D(4,3\times m+2)=R(3\times m+2)$$

$$D(4,3\times m+3)=R(3\times m+3)$$

Q(j,i,k) is given as follows. Namely, when c(j,i,k) is a value of the i-th row and the k-th column of 3×3 matrix U[3,3]×(P[3,3]^(j−1), Q(j,i,k) is given by:

$$Q(j,i,k)=R(3\times m+k) \text{ when } c(j,i,k)=1$$

$$Q(j,i,k)=0 \text{ when } c(j,i,k)=0$$

Thus, when j=1, $$U[3,3] \times (P[3,3]) \wedge (j-1) = U[3,3] \times (P[3,3]) \wedge 0 = U[3,3]$$

$$= \begin{pmatrix} 1 & 1 & 1 \\ 1 & 1 & 0 \\ 1 & 0 & 0 \end{pmatrix}$$

when j=2, $$U[3,3] \times (P[3,3]) \wedge (j-1) = U[3,3] \times (P[3,3]) \wedge 1$$

$$= U[3,3] \times (P[3,3])$$

$$= \begin{pmatrix} 1 & 1 & 1 \\ 1 & 1 & 0 \\ 1 & 0 & 0 \end{pmatrix} \times \begin{pmatrix} 0 & 1 & 0 \\ 0 & 0 & 1 \\ 1 & 0 & 0 \end{pmatrix}$$

$$= \begin{pmatrix} 1 & 1 & 1 \\ 0 & 1 & 1 \\ 0 & 1 & 0 \end{pmatrix}$$

and when j=3, $$U[3,3] \times (P[3,3]) \wedge (j-1) = U[3,3] \times (P[3,3]) \wedge 2$$

$$= U[3,3] \times (P[3,3]) \times (P[3,3])$$

$$= \begin{pmatrix} 1 & 1 & 1 \\ 0 & 1 & 1 \\ 0 & 1 & 0 \end{pmatrix} \times \begin{pmatrix} 0 & 1 & 0 \\ 0 & 0 & 1 \\ 1 & 0 & 0 \end{pmatrix}$$

$$= \begin{pmatrix} 1 & 1 & 1 \\ 1 & 0 & 1 \\ 0 & 0 & 1 \end{pmatrix}$$

Using these, each divided partial data D(i,j) is generated by the following definition formula.

$$D(1, 3 \times m + 1) = S(3 \times m + 1) * Q(1,1,1) * Q(1,1,2) * Q(1,1,3)$$

$$= S(3 \times m + 1) * R(3 \times m + 1) *$$
$$R(3 \times m + 2) * R(3 \times m + 3)$$

$$D(1, 3 \times m + 2) = S(3 \times m + 2) * Q(2,1,1) * Q(2,1,2) * Q(2,1,3)$$

$$= S(3 \times m + 2) * R(3 \times m + 1) *$$
$$R(3 \times m + 2) * R(3 \times m + 3)$$

$$D(1, 3 \times m + 3) = S(3 \times m + 3) * Q(3,1,1) * Q(3,1,2) * Q(3,1,3)$$

$$= S(3 \times m + 3) * R(3 \times m + 1) *$$
$$R(3 \times m + 2) * R(3 \times m + 3)$$

$$D(2, 3 \times m + 1) = S(3 \times m + 1) * Q(1,2,1) * Q(1,2,2) * Q(1,2,3)$$

$$= S(3 \times m + 1) * R(3 \times m + 1) * R(3 \times m + 2)$$

$$D(2, 3 \times m + 2) = S(3 \times m + 2) * Q(2,2,1) * Q(2,2,2) * Q(2,2,3)$$

$$= S(3 \times m + 2) * R(3 \times m + 2) * R(3 \times m + 3)$$

$$D(2, 3 \times m + 3) = S(3 \times m + 3) * Q(3,2,1) * Q(3,2,2) * Q(3,2,3)$$

-continued $$= S(3 \times m + 3) * R(3 \times m + 1) * R(3 \times m + 3)$$

$$D(3, 3 \times m + 1) = S(3 \times m + 1) * Q(1,3,1) * Q(1,3,2) * Q(1,3,3)$$

$$= S(3 \times m + 1) * R(3 \times m + 1)$$

$$D(3, 3 \times m + 2) = S(3 \times m + 2) * Q(2,3,1) * Q(2,3,2) * Q(2,3,3)$$

$$= S(3 \times m + 2) * R(3 \times m + 2)$$

$$D(3, 3 \times m + 3) = S(3 \times m + 3) * Q(3,3,1) * Q(3,3,2) * Q(3,3,3)$$

$$= S(3 \times m + 3) * R(3 \times m + 3)$$

$$D(4, 3 \times m + 1) = R(3 \times m + 1)$$

$$D(4, 3 \times m + 2) = R(3 \times m + 2)$$

$$D(4, 3 \times m + 3) = R(3 \times m + 3)$$

Now, the general form of the division rules for dividing the original data according to the definition formula shown in the step S217 of FIG. 2 or the definition formula shown in the step S317 of FIG. 5 will be described.

Note that the original data, random number, divided data, number of division and processing unit bit length will be denoted as S, R, D, n and b, respectively, and variables i (=1 to n) and j (=1 to n−1) will be used as variables for indicating one of a plurality of data or random numbers, each one of (n−1) sets of the original partial data, (n−1) sets of the random number partial data, n sets of the divided data D, and (n−1) sets of divided partial data of each divided data will be denoted as S(j), R(j), D(j), and D(i,j).

Also, each original partial data S(j) is generated as b bits of data from b×(j−1)+1-th bit of the original data S while changing the above described variable j from I to n-1. Then, when U[n,n] is an n×n upper triangular matrix and P[n,n] is an n×n rotation matrix, c(j,i,k) is defined as a value of the i-th row and the k-th column of an (n−1)×(n−1) matrix U[n−1,n−1]×P[n−1,n−1]^(j−1). Then, Q(j,i,k) is defined as Q(j,i,k)=R(k) when c(j,i,k)=1 and Q(j,i,k)=0 when c(j,i,k)=0. Then, while changing the variable i from 1 to n and changing the variable j from 1 to n−1 for each variable i, when i<n, each divided partial data D(i,j) is set to be:

$$D(i, j) = S(j) * \left( \prod_{k=1}^{n-1} Q(j, i, k) \right)$$

and when i=n, each divided partial data D(i,j) is set to be:

$$D(i,j) = R(j)$$

By repeating the above processing from the top to the tail of the original data S, the number of division n sets of the divided data can be generated from the original data S.

Next, the processing for recovering the original data S from the divided data D(1), D(2), D(3) and D(4) that are generated by dividing the original data S into four as described above will be described with reference to FIG. 6. In the case of the division into four shown in FIG. 6, the original data S can be generated from the general definition formula shown in FIG. 6 using the variable j=3×m+1 (m≧0 is an arbitrary integer) as follows.

First, the case of obtaining the original data S from the divided data D(1) and D(2) will be described.

$$D(1, j) * D(2, j) = (S(j) * R(j) * R(j+1) * R(j+2)) *$$
$$((S(j) * R(j) * R(j+1))$$
$$= (S(j) * S(j)) * (R(j) * R(j)) *$$
$$(R(j+1) * R(j+1)) * R(j+2))$$
$$= 0 * 0 * 0 * R(j+2)$$
$$= R(j+2)$$

Consequently, the random number R(j+2) can be obtained by calculating D(1,j)*D(2,j), and similarly, the random number R(j) can be obtained by calculating D(1,j+1)*D(2,j+1) and the random number R(j+1) can be obtained by calculating D(1,j+2)*D(2,j+2). Then, by using these obtained random numbers R(j), R(j+1) and R(j+2):

$$D(1, j) * R(j) * R(j+1) * R(j+2) = (S(j) * R(j) * R(j+1) *$$
$$R(j+2)) * ((R(j) * R(j+1) *$$
$$R(j+2))$$
$$= S(j) * (R(j) * R(j)) *$$
$$(R(j+1) * R(j+1)) *$$
$$(R(j+2) * R(j+2))$$
$$= S(j) * 0 * 0 * 0$$
$$= S(j)$$

so that S(j) can be obtained by calculating either D(1,j)*R(j)*R(j+1)*R(j+2) or D(2,j)*R(j)*R(j+1).

Similarly, S(j+1) can be obtained by calculating either D(1,j+1)*R(j)*R(j+1)*R(j+2) or D(2,j+1)*R(j+1)*R(j+2), and S(j+2) can be obtained by calculating either D(1,j+2)*R(j)*R(j+1)*R(j+2) or D(2,j+2)*R(j)*R(j+2).

Also, similarly as described above, S can be obtained from D(2) and D(3).

More specifically, first R(j), R(j+1) and R(j+2) are obtained, and then S(j), S(j+1) and S(j+2) can be obtained by the XOR calculation of D(2,j), D(2,j+1), D(2,j+2) or D(3,j), D(3,j+1), D(3,j+2) with R(j), R(j+1), R(j+2).

Also similarly, S can be obtained from D(1) and D(4), or D(2) and D(4), or D(3) and D(4).

D(4) us defined by R itself, so that R(j), R(j+1) and R(j+2) can be obtained from D(4) without any calculation. For example, S(j), S(j+1) and S(j+2) can be obtained by the XOR calculation of D(1,j), D(1,j+1), D(1,j+2) with R(j), R(j+1), R(j+2).

As described above, S can be recovered from two arbitrary divided data D(1) and D(2), or D(2) and D(3), or D(4) and any arbitrary one of the divided data D(1), D(2) or D(3), for which a difference in the number of calculation is one. Namely, if three divided data among the four divided data are acquired, at least one of the above described cases can be realized so that the original data can be recovered from arbitrary three divided data among the four divided data.

FIG. 7 shows a table indicating the divided data and the definition formula in the case of the division into five. In the case of the division into five, the recovery processing similar to the above described case of the division into four can be realized by using the definition formula for the divided data and j=4×m+1 (m≧0 is arbitrary integer). Consequently, S can be recovered from two arbitrary divided data D(1) and D(2), or D(2) and D(3), or D(3) and D(4), or D(5) and any arbitrary one of the divided data D(1), D(2), D(3) or D(4), for which a difference in the number of calculation is one. Namely, if three divided data among the five divided data are acquired, at least one of the above described cases can be realized so that the original data can be recovered from arbitrary three divided data among the five divided data.

Also, even when the number of division n is set to be greater than 5, by forming the divided data similarly, the original data can be recovered from (n+1)/2 sets of the divided data if n is an odd number, or (n/2)+1 sets of the divided data if n is an even number. This number of sets is obtained as one plus the maximum number that can be selected when there are n divided data, the adjacent divided data are not to be selected and the n-th divided data is not to be selected. In other words, if the maximum number plus one sets of the divided data are acquired, two divided data for which a difference in the number of calculation is one or the n-th divided data and any other divided data are surely contained among them, so that this gives the number of divided data that are necessary for the recovery.

Figure 8:
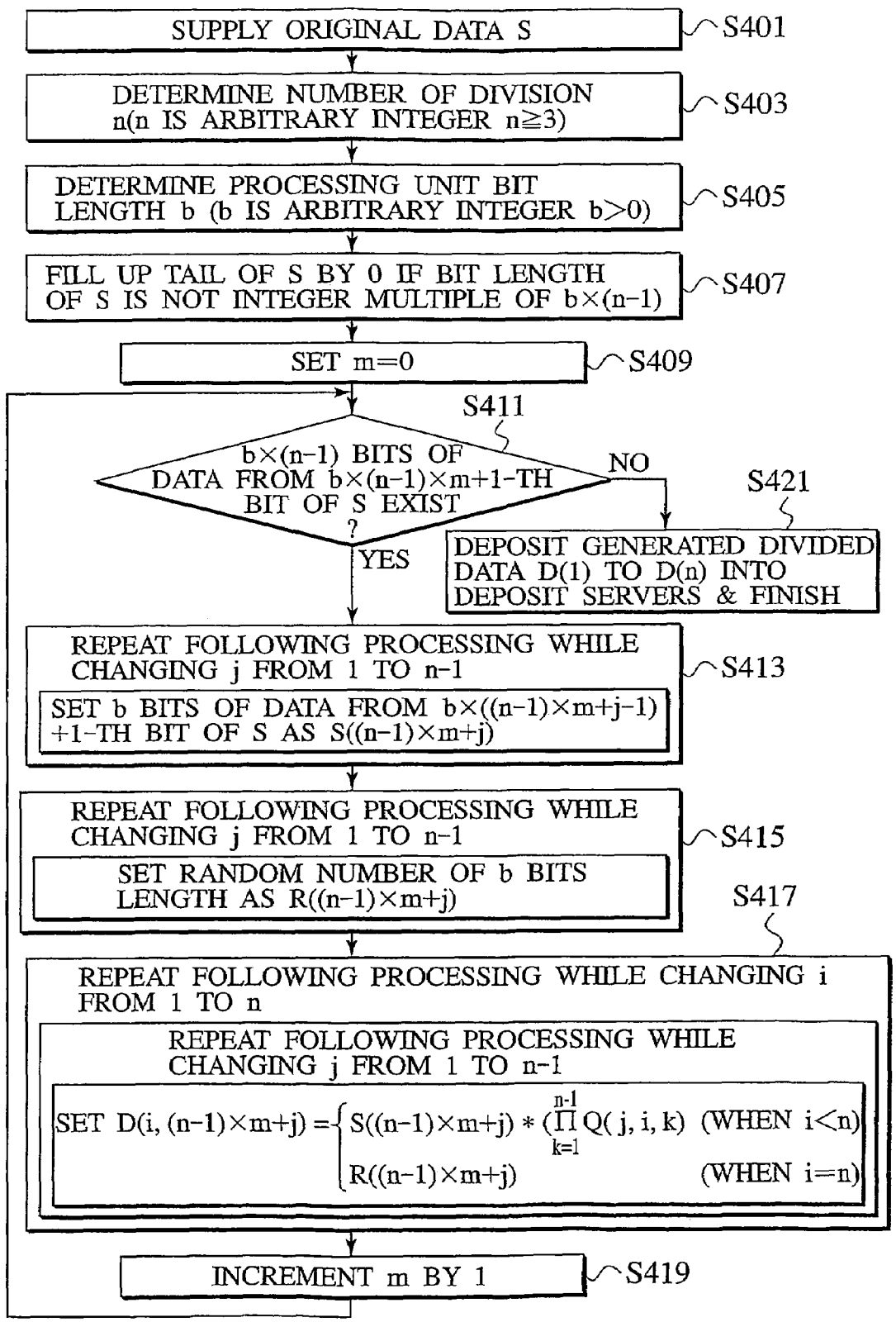
FIG. 8 is a flow chart showing a division processing by the data division device shown in FIG. 1, in the case where a number of division is n.

Next, with reference to FIG. 8, the general division processing in the case where the number of division is n and the processing unit bit length is b will be described.

First, the user transmits the original data S by making an access to the division device 1 from the terminal 5, and the data transmission and reception unit 17 of the division device 1 receives the original data S from the terminal 5 and supplies it to the division device 1 (step S401). Then, the user specifies the number of division n (arbitrary integer n≧3) to the division device 1 from the terminal 5 (step S403). This number of division n may be a value predetermined by the division device 1. Also, the processing unit bit length b is determined (step S405), where n is an arbitrary integer greater than zero.

Next, whether the bit length of the original data S is an integer multiple of b×(n−1) or not is judged, and if it is not an integer multiple, the tail of the original data S is filled up by 0 (step S407). Also, a variable m which indicates an integer multiple is set to 0 (step S409).

Next, whether b×(n−1) bits of data from the b×(n−1)×m+1-th bit of the original data S exist or not is judged (step S411). As a result of this judgement, if the data do not exist, the processing will proceed to the step S421, but currently the variable m is set to 0 at the step S409 and the data exist so that the processing proceeds to the step S413.

At the step S413, b bits of data from b×((n−1)×m+j−1)+1-th bit of the original data S is set as the original partial data S((n−1)×m+j) while changing the variable j from 1 to n−1, such that (n−1) sets of the original partial data S(1), S(2), ..., S(n−1) resulting from the division of the original data S by the processing unit bit length b are generated.

Next, the random number with a length equal to the processing unit bit length b generated by the random number generation unit 15 is set as the random number partial data R((n−1)×m+j) while changing the variable j from 1 to n−1, such that (n−1) sets of the random number partial data R(1), R(2), ..., R(n−1) resulting from the division of the random number R by the processing unit bit length b are generated (step S415).

Next, at the step S417, each divided partial data D(i,(n−1)×m+j) that constitutes each one of the plurality of the divided data D(i) is generated according to the definition formula for generating the divided data as shown in the step S417, while changing the variable i from 1 to n and changing the variable j from 1 to n−1 for each variable i. As a result, the following divided data D are generated.

$$\text{Divided data } D = n \text{ sets of divided data } D(i)$$
$$= D(1), D(2), \cdots, D(n)$$
$$\text{First divided data } D(1) = n - 1 \text{ sets of divided partial data } D(1, j)$$
$$= D(1, 1), D(1, 2), \cdots, D(1, n-1)$$
$$\text{Second divided data } D(2) = n - 1 \text{ sets of divided partial}$$
$$\text{data } D(2, j)$$
$$= D(2, 1), D(2, 2), \cdots, D(2, n-1)$$
$$\ldots$$
$$n\text{-th divided data } D(n) = n - 1 \text{ sets of divided partial data } D(3, j)$$
$$= D(n, 1), D(n, 2), \cdots, D(n, n-1)$$

After generating the divided data D in this way for the case where the variable m=0, the variable m is incremented by 1 (step S419), and the processing returns to the step S411, where the similar division processing for data starting from the b×(n−1)-th bit of the original data S corresponding to the variable m=1 is carried out. Finally, when all the data of the original data are processed as a result of the judgement at the step S411, the processing proceeds from the step S411 to the step S421, where the divided data D generated as described above are transmitted to the deposit servers 7 respectively, from the data transmission and reception unit 17 of the division device 1 through the network 3, such that they are deposited in the respective deposit servers 7 and then the division processing is finished. Note that there are three deposit servers 7 shown in FIG. 1, but it is preferable to increase the deposit servers according to the number of division such that different divided data can be deposited into different deposit servers.

Figure 9:
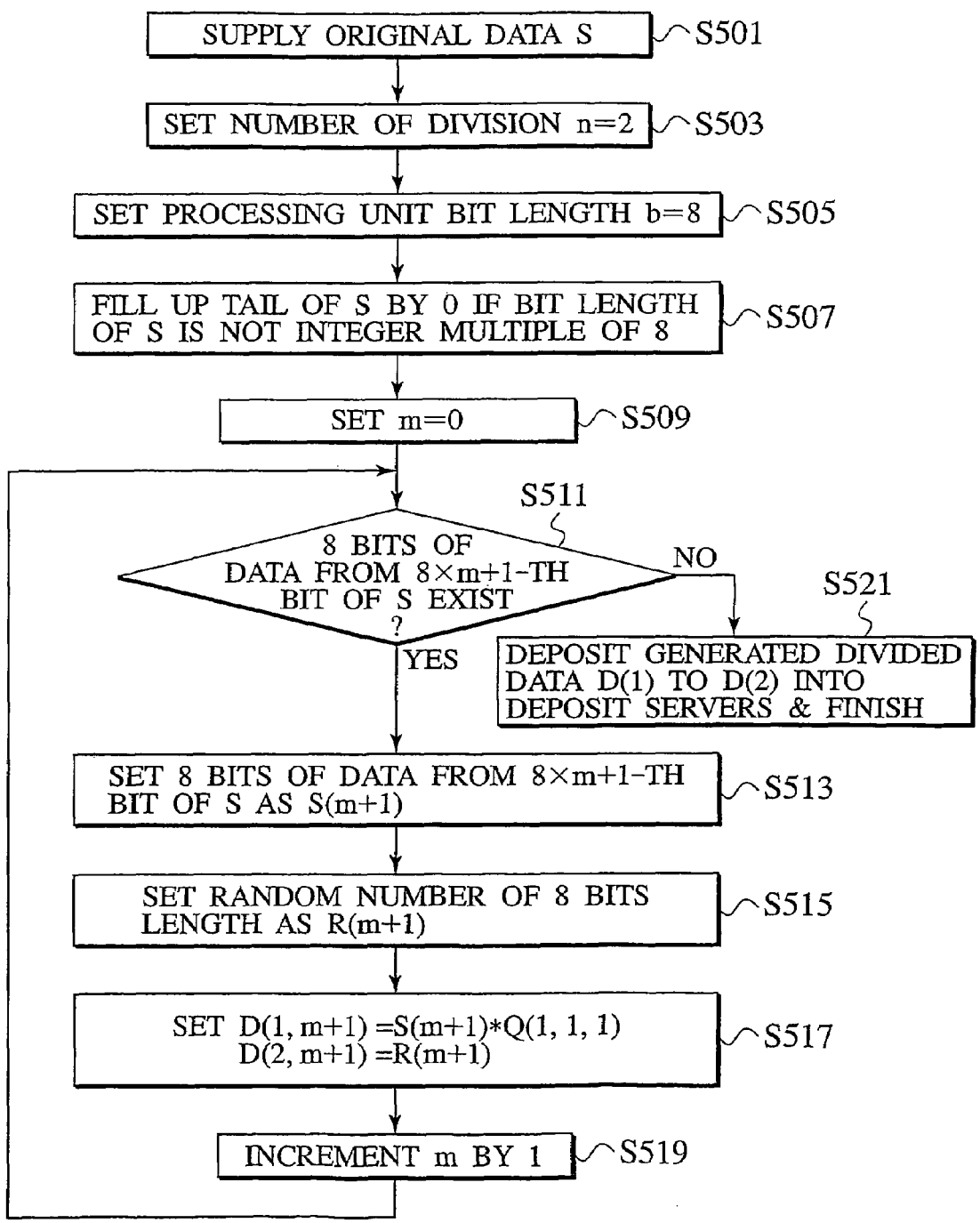
FIG. 9 is a flow chart showing a division processing by the data division device shown in FIG. 1, in the case where a number of division is two.

Next, with reference to FIG. 9, the division processing in the case where the number of division n is 2. Namely, the embodiments described above are directed to the case where the number of division n is greater than or equal to 3 (n≧3) as indicated in the step S403 of FIG. 8, so that the case where the number of division is two will be described by using FIG. 9.

First, the user supplies the original data S by making an access to the division device 1 from the terminal 5 (step S501). Then, thei division n as 2 to the division device 1 from the terminal 5 (step S503). This number of division n may be a value predetermined by the division device 1. Also, the processing unit bit length b is determined as 8 bits (step S505). Next, whether the bit length of the original data S is an integer multiple of 8 or not is judged, and if it is not an integer multiple, the tail of the original data S is filled up by 0 (step S507). Also, a variable m which indicates an integer multiple is set to 0 (step S509).

Next, whether 8 bits of data from the 8×m+1-th bit of the original data S exist or not is judged (step S511). As a result of this judgement, if the data do not exist, the processing will proceed to the step S521, but currently the variable m is set to 0 and the data exist so that the processing proceeds to the step S513.

At the step S513, 8 bits of data from 8×m+1-th bit of the original data S is set as the original partial data S(m+1), such that the original partial data S(1) is generated.

Next, the random number with a length equal to 8 bits generated by the random number generation unit 15 is set as the random number partial data R(m+1) such that the random number partial data R(1) is generated (step S515).

Next, at the step S517, each divided partial data D(i,m+1) and D(2,m+1) that constitutes each one of the divided data D are generated according to the definition formula for generating the divided data as shown in the step S517.

After generating the divided data D in this way for the case where the variable m=0, the variable m is incremented by 1 (step S519), and the processing returns to the step S511, where the similar division processing for data starting from the b×(n−1)-th bit of the original data S corresponding to the variable m=1 is carried out. Finally, when all the data of the original data are processed as a result of the judgement at the step S511, the processing proceeds from the step S511 to the step S521, where the divided data D(1) and D(2) generated as described above are transmitted to the deposit servers 7 respectively, from the data transmission and reception unit 17 of the division device 1 through the network 3, such that they are deposited in the respective deposit servers 7 and then the division processing is finished. Note that there are three deposit servers 7 shown in FIG. 1, and it suffices to deposit the divided data into two of these deposit servers in this case.

Now, the divided data generation processing using the definition formula shown in the step S517 of FIG. 9 described above, or more specifically the divided data generation processing in the case where the number of division n=2, will be described.

First, in the case where the variable m=0, from the definition formula shown in the step S517, the divided partial data D(1,1) and D(2,1) are as follows.

$$D(1,1) = S(1) * Q(1,1,1)$$

$$D(2,1) = R(1)$$

Next, Q(j,i,k) is given as follows. Here, in the case of n=2, all of j, i and k only takes a value 1. When c(j,i,k) is a value of the i-th row and the k-th column of 1×1 matrix U[1,1]×(P[1, 1]^(j−1), Q(j,i,k) is given by:

$$Q(j, i, k) = R(k) \text{ when } c(j, i, k) = 1$$
$$Q(j, i, k) = 0 \text{ when } c(j, i, k) = 1$$
$$U[1, 1] \times (P[1, 1])^{\wedge}(j - 1) = U[1, 1] \times (P[1, 1])^{\wedge}0$$
$$= (1) \times E[1, 1]$$
$$= (1) \times (1)$$
$$= (1)$$

Consequently, c(1,1,1) is defined as 1 so that Q(1,1,1) is defined as R(1).

Using these, each divided partial data is generated by the following definition formula.

$$D(1,1) = S(1) * R(1)$$

$$D(2,1) = R(1)$$

When the variable m is used, each divided partial data is generated by the following definition formula.

$$D(1, m+1) = S(m+1) * R(m+1)$$

$$D(2, m+1) = R(m+1)$$

Note that, in the case of the number of division n=2, the original data S cannot be recovered by acquiring only one of the two divided data, so that the original data S have to be recovered by acquiring both of the two divided data.

Now, in the amendments described above, there can be cases where the random number components can be eliminated by carrying out the calculation among the divided partial data that constitute one and the same divided data. Namely, in the case of the division into three, for example, the divided partial data are as shown in FIG. 4, which are defined as follows.

$D(1,1)=S(1)*R(1)*R(2), D(1,2)=S(2)*R(1)*R(2),$ $D(2,1)=S(1)*R(1), D(2,2)=S(2)*R(2),$ $D(3,1)=R(1), D(3,2)=R(2),$

For D(1), if D(1,1) and D(1,2) are acquired, for example, it follows that:

$$D(1,1)*D(1,2) = (S(1)*R(1)*R(2))*(S(2)*R(1)*R(2))$$
$$= S(1)*S(2)*(R(1)*R(1))*(R(2)*R(2))$$
$$= S(1)*S(2)*0*0$$
$$= S(1)*S(2)$$

In general, $D(i,j)*D(1,j+1)=S(j)*S(j+1)$, where $j=2\times m+1$ and $m \geq 0$ is an arbitrary integer.

As can be seen from the above described definition, D(1,1) and D(1,2) are generated by the calculation on the original data and the random number, and the content of the original data cannot be ascertained from each one of D(1,1) and D(1,2) alone, but by carrying out the calculation of D(1,1)*D(1,2), it is possible to obtain S(1)*S(2). This is not the same as the original data itself, but it contains no random number component.

When the random number component is eliminated, the following problem arises. Namely, regarding the individual original partial data, if a part of S(2) becomes known, for example, it would become possible to recover a part of S(1) so that it can be considered as not safe. For example, when the original data is data according to a standard data format, and S(2) is a portion containing the header information in that data format or the padding (a part of a data region filled up by 0, for example), etc., this portion may contain keywords or fixed character strings specific to this data format, so that it may become possible to conjecture its content. Also, a part of S(1) may be recovered from the known portion of S(2) and a value of S(1)*S(2).

In the case of the division into four, it can be seen from FIG. 6 that $D(2,j)*D(2,j+1)*D(2,j+2)=S(j)*S(j+1)*S(j+2)$, where $j=3\times m+1$ and $m \geq 0$ is an arbitrary integer.

In the case of the division into five, it can be seen from FIG. 7 that $D(i,j)*D(i,j+1)*D(i,j+2)*D(i,j+3)=S(j)*S(j+1)*S(j+2)*S(j+3)$, where i=1 or 3, $j=4\times m+1$ and $m \geq 0$ is an arbitrary integer.

Even in the case where the number of division is greater than five, the random number component can be eliminated by the similar calculation. Note that this problem does not arise in the case where the number of division is two.

One possible way of solving the above described problem which is applicable to the case of the division into three is as follows.

FIG. 10 shows the divided partial data in this case, in which D(1,j+1) and D(2,j+1) as shown in FIG. 4 are interchanged, where $j=2\times m+1$ and $m \geq 0$ is an arbitrary integer.

In this case, the random number components cannot be eliminated even when the calculation among the divided partial data that constitute one and the same divided data is carried out, as follows. It can be seen from FIG. 10 that:

$$D(1,j)*D(1,j+1) = (S(j)*R(j)*R(j+1))*$$
$$(S(j+1)*R(j+1))$$
$$= S(j)*S(j+1)*R(j)*(R(j+1)*R(j+1))$$
$$= S(j)*S(j+1)*R(j)*0$$
$$= S(j)*S(j+1)*R(j)$$

$$D(2,j)*D(2,j+1) = (S(j)*R(j))*(S(j+1)*R(j)*R(j+1))$$
$$= S(j)*S(j+1)*(R(j)*R(j))*R(j+1)$$
$$= S(j)*S(j+1)*0*R(j+1)$$
$$= S(j)*S(j+1)*R(j+1)$$

$$D(3,j)*D(3,j+1) = R(j)*R(j+1)$$

Also, in this case, the property that the original data can be recovered from two divided data among the three divided data is still intact as follows.

In the case of recovering the original data by acquiring D(1) and D(2), it should be apparent that the original data can be recovered because D(1) and D(2) of FIG. 10 are obtained by simply interchanging the divided partial data that constitute D(1) and D(2) of FIG. 4.

In the case of recovering the original data by acquiring D(1) and D(3), or D(2) and D(3), because D(3) is the divided data that comprise only the random numbers, it is possible to recover the original data by eliminating the random number portion by carrying out the exclusive OR calculation with as many random numbers as necessary for each divided partial data of D(1) or D(2).

Another possible way of solving the above described problem which is applicable to any number of division greater than or equal three is as follows.

FIGS. 11, 12 and 13 show the divided partial data in this case, in which R(j) is removed from each definition formula for generating D(i,j) as shown in FIGS. 4, 6 and 7, where n−1>i>0, $j=(n-1)\times m+1$, $m \geq 0$ is an arbitrary integer and n is the number of division. This also applies to the case where the number of division is greater than five.

In this case, the random number components cannot be eliminated even when the calculation among the divided partial data that constitute one and the same divided data is carried out, as follows.

In FIGS. 4, 6 and 7, when the calculation among the divided partial data that constitute one and the same divided data is carried out, the random number components are eliminated as $D(1,j)*D(1,j+1)=S(j)*S(j+1)$ (where $j=2\times m+1$ and $m \geq 0$ is an arbitrary integer) in the case of the division into three, $D(2,j)*D(2,j+1)*D(2,j+2)=S(j)*S(j+1)*S(j+2)$ (where $j=3\times m+1$ and $m \geq 0$ is an arbitrary integer) in the case of the division into four, and $D(i,j)*D(i,j+1)*D(i,j+2)*D(i,j+3)=S(j)*S(j+1)*S(j+2)*S(j+3)$ (where i=1 or 3, $j=4\times m+1$ and $m \geq 0$ is an arbitrary integer) in the case of the division into five.

However, as noted above, R(j) is removed from each definition formula for generating D(i,j) in this case (where n−1>i>0, $j=(n-1)\times m+1$, $m \geq 0$ is an arbitrary integer and n is the number of division), so that one R(j) will surely remain.

Also, in this case, the property that the original data can be recovered from a prescribed number of the divided data among the n sets of the divided data is still intact as follows.

First, the case of the division into three is as follows, in the case of recovering the original data by acquiring D(1) and D(2), R(j) (where j=2×m+1, m≧0 is an arbitrary integer) can be obtained by calculating D(1,j+1)*D(2,j+1) as described above, S(j) can be obtained by:

$$D(2, j) * R(j) = S(j) * R(j) * R(j)$$
$$= S(j) * 0$$
$$= S(j)$$

and R(j+1) can be obtained by:

$$D(1, j) * S(j) = S(j) * R(j+1) * S(j)$$
$$= S(j) * S(j) * R(j+1)$$
$$= 0 * R(j+1)$$
$$= R(j+1)$$

so that S(j+1) can be obtained by calculating D(2,j+1)*R(j+1) as described above.

In the case of recovering the original data by acquiring D(1) and D(3), or D(2) and D(3), because D(3) is the divided data that comprise only the random numbers, it is possible to recover the original data by eliminating the random number portion by carrying out the exclusive OR calculation with as many random numbers as necessary for each divided partial data of D(1) or D(2).

Next, the case of the division into four is as follows. In the case of recovering the original data by acquiring D(1) and D(2), R(j+2) can be obtained by:

$$D(1, j) * D(2, j) = (S(j) * R(j+1) * R(j+2)) * S(j) * R(j+1))$$
$$= (S(j) * S(j)) * (R(j+1) * R(j+1)) * R(j+2)$$
$$= 0 * 0 * R(j+2)$$
$$= R(j+2)$$

so that S(j) can be obtained by calculating D(1,j)*R(j+1)*R(j+2) or D(2,j)*R(j+1) as described above.

In the case of recovering the original data by acquiring D(2) and D(3), R(j+2) can be obtained by calculating D(2,j+1)*D(3,j+1) as described above, R(j) can be obtained by calculating D(2,j+2)*D(3,j+2) as described above, S(j) can be obtained by:

$$D(3, j) * R(j) = (S(j) * R(j)) * R(j)$$
$$= S(j) * ((R(j) * R(j))$$
$$= S(j) * 0$$
$$= S(j)$$

and R(j+1) can be obtained by:

$$D(2, j) * S(j) = (S(j) * R(j+1)) * S(j)$$
$$= (S(j) * S(j)) * R(j+1)$$
$$= 0 * R(j+1)$$
$$= R(j+1)$$

so that S(j) can be obtained by calculating D(1,j)*R(j+1)*R(j+2) or D(2,j)*R(j+1) as described above.

In the case of recovering the original data by acquiring D(4) and any one of D(1), D(2) and D(3), because D(4) is the divided data that comprise only the random numbers, it is possible to recover the original data by eliminating the random number portion by carrying out the exclusive OR calculation with as many random numbers as necessary for each divided partial data of D(1) or D(2) or D(3).

Consequently, S can be recovered from two arbitrary divided data D(1) and D(2), or D(2) and D(3), or D(4) and any arbitrary one of the divided data D(1), D(2) or D(3), for which a difference in the number of calculation is one. Namely, if three divided data among the four divided data are acquired, at least one of the above described cases can be realized so that the original data can be recovered from arbitrary three divided data among the four divided data.

Next, the case of the division into five is basically the same as the case of the division into four, in all of the case of recovering S by acquiring D(1) and D(2), or D(2) and D(3), the case of recovering S by acquiring D(3) and D(4), and the case of recovering S by acquiring D(5) and any one of D(1), D(2), D(3) and D(4).

Consequently, S can be recovered from two arbitrary divided data D(1) and D(2), or D(2) and D(3), or D(3) and D(4), or D(5) and any arbitrary one of the divided data D(1), D(2), D(3) or D(4), for which a difference in the number of calculation is one. Namely, if three divided data among the five divided data are acquired, at least one of the above described cases can be realized so that the original data can be recovered from arbitrary three divided data among the five divided data.

Also, even when the number of division n is set to be greater than 5, by forming the divided data similarly, the original data can be recovered from (n+1)/2 sets of the divided data if n is an odd number, or (n/2)+1 sets of the divided data if n is an even number. This number of sets is obtained as one plus the maximum number that can be selected when there are n divided data, the adjacent divided data are not to be selected and the n-th divided data is not to be selected. In other words, if the maximum number plus one sets of the divided data are acquired, two divided data for which a difference in the number of calculation is one or the n-th divided data and any other divided data are surely contained among them, so that this gives the number of divided data that are necessary for the recovery.

Note that the processing procedure of the data division method of the above described embodiment can be recorded on a recording medium such as CD or FD and this recording medium can be incorporated into a computer system. The program recorded on the recording medium can be downloaded into the computer system through a communication channel, or installed into the computer system from the recording medium, and then the computer system can be operated by the program such that the computer system functions as a data division device for realizing the data division method. By using such a recording medium, the distribution of the program can be improved.

As described above, according to the above described embodiment, the prescribed definition formula comprises the exclusive OR of the original partial data and the random number partial data, so that the high speed and high performance calculation processing power for carrying out the polynomial and residue calculation as required conventionally is not necessary, and it is possible to generate the divided data easily and quickly by repeating a simple calculation processing even with respect to the large capacity data.

Also, the original data is recovered by applying the definition formula to the divided data in a number less than the number of division among a plurality of the divided data that are generated, so that the original data can be recovered by the divided data in a prescribed number x which is less than the number of division, and the original data can be recovered even when as many divided data as the number of division minus x are lost or destroyed.

In addition, the original data is received from the terminal through the network, and the plurality of divided partial data generated by applying the original partial data, random number partial data and divided partial data generation processing with respect to this original data are transmitted to the deposit servers through the network and stored and managed by the deposit servers, so that many users can make accesses from the terminals through the network and make request for the data division, so that the data division device can be shared by many users and can be made economical.

As described, according to the present invention, the original data is divided by the processing unit bit length into a plurality of original partial data, a plurality of random number partial data are generated, and divided partial data that constitute each divided data are generated according to a prescribed definition formula formed by the exclusive OR of the original partial data and the random number partial data, so that by using a definition formula formed by the exclusive OR calculation which is a bit calculation suitable for the computer processing rather than the polynomial and the residue calculation conventionally used, it does not require a high speed and high performance calculation processing power, the divided data can be generated easily and quickly even for the large capacity data by repeating the simple calculation processing, and the memory capacity required for maintaining the divided data becomes smaller than the capacity that is linearly proportional to the number of division.

It is to be noted that the embodiments described above is directed to the case where the divided data include one divided data formed by a random number alone, and one or more divided data formed by the divided partial data generated by the exclusive OR calculation of one original partial data and one or more random number partial data.

However, it is also possible to modify these embodiments such that the divided data include one or more divided data formed by a random number alone, and one or more divided data formed by the divided partial data generated by the exclusive OR calculation of one or more original partial data and one or more random number partial data.

It is also possible to modify these embodiments such that the divided data include two or more divided data formed by the divided partial data generated by the exclusive OR calculation of one or more original partial data and one or more random number partial data.

It is also to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A data division method for dividing original data into as many divided data as a desired number of divisions by using a prescribed processing unit bit length, comprising the steps of:
   generating a plurality of original partial data by dividing the original data by the prescribed processing unit bit length;
   generating a plurality of random number partial data each having a length equal to the prescribed processing unit bit length, from a random number having a length less than or equal to a bit length of the original data, in correspondence to the plurality of original partial data;
   generating a plurality of divided partial data that constitute each divided data by using exclusive OR calculation of the original partial data and the random number partial data, each divided partial data having a length equal to the prescribed processing unit bit length; and
   generating the divided data in the desired number of divisions from the plurality of divided partial data, such that the original data cannot be ascertained from any one divided data alone but the original data can be recovered from a prescribed number of the divided data among generated divided data.

2. The data division method of claim 1, wherein the original partial data and the random number partial data are generated as many as the desired number of divisions minus one.

3. The data division method of claim 1, wherein the divided data include one or more divided data formed by a random number alone, and one or more divided data formed by the divided partial data generated by the exclusive OR calculation of one or more original partial data and one or more random number partial data.

4. The data division method of claim 3, wherein the one divided data formed by a random number alone is formed by repeating a random number with an arbitrarily determined length.

5. The data division method of claim 3, wherein the one divided data formed by a random number alone is formed by a pseudo-random number generated from information of a prescribed length according to a pseudo-random number generation algorithm.

6. The data division method of claim 1, wherein the divided data include two or more divided data formed by the divided partial data generated by the exclusive OR calculation of one or more original partial data and one or more random number partial data.

7. The data division method of claim 1, wherein when the original data, the random number, the divided data, the desired number of divisions and the processing unit bit length are denoted as S, R, D, n and b, respectively, variables i (=1 to n) and j (=1 to n−1) are used as variables, each one of (n−1) sets of the original partial data, (n−1) sets of the random number partial data, n sets of the divided data D, and (n−1) sets of divided partial data of each divided data are denoted as S(j), R(j), D(j), and D(i,j), respectively, each original partial data S(j) is generated as b bits of data from bx(j−i)+1−th bit of the original data S while changing a variable j from 1 to n−1, U[n,n] is an n×n matrix with u(i,j) indicating a value of i-th row and j-th column given by:

$u(i,j)=1$ when $i+j \leq n+1$ $u(i,j)=0$ when $i+j > n+1$

P[n,n] is an nxn matrix with p(i,j) indicating a value of i-th row and j-th column given by:

$p(i,j)=1$ when $j=i+1$ $p(i,j)=1$ when $i=n, j=1$ $p(i,j)=0$ otherwise c(j,i,k) is defined as a value of i-th row and k-th column of an (n−1)×(n−1) matrix U[n−1,n−1]×P[n−1,n−1]^(j−1), where U[n−1,n−1]×P[n−1,n−1]^(j−1) denotes a product of a matrix U[n−1,n−1] and (j−1) sets of a matrix ×P[n−1,n−1], and Q(j,i,k) is defined as Q(j,i,k)=R(k) when c(j,i,k)=1 and Q(j,i,k)=0 when c(j,i,k)=0, each divided partial data D(i,j) is generated by:

$$D(i, j) = S(j) * \left(\prod_{k=1}^{n-1} Q(j, i, k)\right) \text{ when } i < n$$

$$D(i, j) = R(j) \text{ when } i = n$$

while changing a variable i from 1 to n and changing a variable j from 1 to n−1 for each variable i, where $$\prod_{k=1}^{n-1} Q(j, i, k) = Q(j, i, 1) * Q(j, i, 2) * \cdots * Q(j, i, n-1)$$

and * denotes the exclusive OR calculation.

8. The data division method of claim 1, wherein each divided data is generated such that a random number component cannot be eliminated by carrying out calculation among the divided partial data that constitute the each divided data.

9. The data division method of claim 8, wherein each divided data is generated by first generating the plurality of divided partial data that constitute each divided data by using a prescribed definition formula formed by the exclusive OR calculation of the original partial data and the random number partial data, and then interchanging one divided partial data and another divided partial data among the divided partial data that constitute each divided data.

10. The data division method of claim 8, wherein each divided data is generated by first generating the plurality of divided partial data D(i,j) that constitute each divided data D(i) by using a prescribed definition formula formed by the exclusive OR calculation of the original partial data and the random number partial data, and then removing a j-th random number partial data R(j) from D(i,j) with a value of i in a range of n−1>i >0, where n is the desired number of divisions, j = (n−1)×m+1, and m ≧0 is an arbitrary integer.

11. A data division device for dividing original data into as many divided data as a desired number of divisions by using a prescribed processing unit bit length, comprising:

an original partial data generation unit configured to generate a plurality of original partial data by dividing the original data by the prescribed processing unit bit length;

a random number generation unit configured to generate a plurality of random number partial data each having a length equal to the prescribed processing unit bit length, from a random number having a length less than or equal to a bit length of the original data, in correspondence to the plurality of original partial data;

a divided partial data generation unit configured to generate a plurality of divided partial data that constitute each divided data by using exclusive OR calculation of the original partial data and the random number partial data, each divided partial data having a length equal to the prescribed processing unit bit length; and a divided data generation unit configured to generate the divided data in the desired number of divisions from the plurality of divided partial data, such that the original data cannot be ascertained from any one divided data alone but the original data can be recovered from a prescribed number of the divided data among generated divided data.

12. A computer program product for causing a computer to function as a data division device for dividing original data into as many divided data as a desired number of divisions by using a prescribed processing unit bit length, the computer program product comprising:

a first computer program code for causing the computer to generate a plurality of original partial data by dividing the original data by the prescribed processing unit bit length;

a second computer program code for causing the computer to generate a plurality of random number partial data each having a length equal to the prescribed processing unit bit length, from a random number having a length less than or equal to a bit length of the original data, in correspondence to the plurality of original partial data;

a third computer program code for causing the computer to generate a plurality of divided partial data that constitute each divided data by using exclusive OR calculation of the original partial data and the random number partial data, each divided partial data having a length equal to the prescribed processing unit bit length; and a fourth computer program code for causing the computer to generate the divided data in the desired number of divisions from the plurality of divided partial data, such that the original data cannot be ascertained from any one divided data alone but the original data can be recovered from a prescribed number of the divided data among generated divided data.

* * * * *